United States Patent
Larsen et al.

(10) Patent No.: US 12,059,997 B2
(45) Date of Patent: Aug. 13, 2024

(54) SYSTEM AND METHOD FOR CONTROLLING AN ELECTRIC VEHICLE HEADLIGHT

(71) Applicant: Taiga Motors Inc., LaSalle (CA)

(72) Inventors: Cyrus Larsen, Montreal (CA); Samuel Bruneau, Montreal (CA)

(73) Assignee: Taiga Motors Inc., LaSalle (CA)

( * ) Notice: Subject to any disclaimer, the term of this patent is extended or adjusted under 35 U.S.C. 154(b) by 0 days.

(21) Appl. No.: 18/074,120

(22) Filed: Dec. 2, 2022

(65) Prior Publication Data

US 2024/0181955 A1 Jun. 6, 2024

(51) Int. Cl.
*B60L 1/14* (2006.01)
*B60Q 1/04* (2006.01)
*B60Q 1/14* (2006.01)

(52) U.S. Cl.
CPC ............ *B60Q 1/143* (2013.01); *B60L 1/14* (2013.01); *B60Q 1/0408* (2013.01); *B60Y 2200/252* (2013.01)

(58) Field of Classification Search
CPC .... B60Q 1/143; B60Q 1/06; B60Y 2200/252; B60Y 2200/91
USPC ........................................................ 340/468
See application file for complete search history.

(56) References Cited

U.S. PATENT DOCUMENTS

| | | | | |
|---|---|---|---|---|
| 11,130,439 | B2* | 9/2021 | Ben Attouch | B60Q 1/0076 |
| 2005/0209747 | A1* | 9/2005 | Yakes | H02J 7/00712 701/22 |
| 2010/0168945 | A1* | 7/2010 | Ohno | B60Y 2200/252 |
| 2017/0158118 | A1* | 6/2017 | Lenker | B60Q 1/52 |
| 2019/0241086 | A1* | 8/2019 | Bojahr | H04W 4/021 |
| 2020/0317057 | A1* | 10/2020 | Salter | B60K 6/26 |
| 2021/0188383 | A1* | 6/2021 | Rhodes | B62J 50/22 |
| 2021/0192229 | A1 | 6/2021 | Johnson et al. | |
| 2023/0024039 | A1* | 1/2023 | Shaughnessy | B60K 35/80 |

OTHER PUBLICATIONS

Reddit Post "Finally figured out how to turn off lights without getting out", https://www.reddit.com/r/TeslaModel3/comments/e14w6i/finally_figured_out_how_to_turn_off_lights/, posted Nov. 24, 2019, retrieved on Dec. 1, 2022.

* cited by examiner

*Primary Examiner* — Qutbuddin Ghulamali

(57) ABSTRACT

In one aspect, responsive to determining that an electric vehicle is connected to an external power source, an operator interface of the electric vehicle is enabled to command a headlight of the electric vehicle into an off condition. Responsive to determining that the electric vehicle is disconnected from the external power source and that the electric motor of the electric vehicle is powered, the headlight of the electric vehicle is maintained in an on condition, and the operator interface from commanding the headlight into the off condition is disabled. In another aspect, an electric vehicle headlight may be rendered non-deactivatable when an accelerator of the electric vehicle is enabled, and the headlight may be rendered deactivatable when an accelerator of the electric vehicle is disabled.

18 Claims, 11 Drawing Sheets

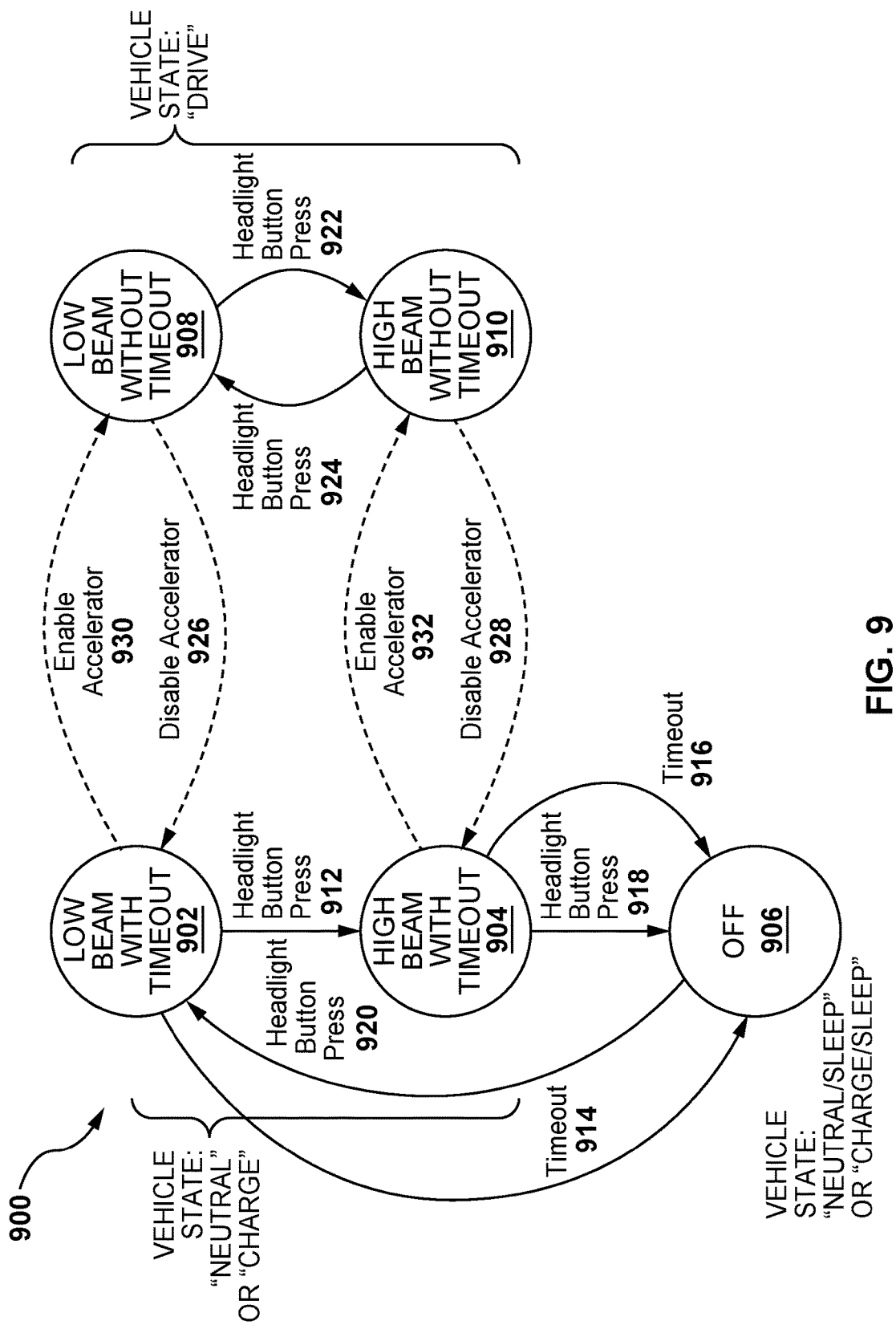

SYSTEM AND METHOD FOR CONTROLLING AN ELECTRIC VEHICLE HEADLIGHT

TECHNICAL FIELD

The present disclosure relates to electric vehicles having at least one headlight, and more particularly to a system and method for controlling an electric vehicle headlight.

BACKGROUND

Motorized vehicles with internal combustion engines typically have an ignition switch or button. The ignition switch or button activates a starter motor that starts the engine. The operator of the vehicle can typically hear that the engine has started and that the vehicle is ready to be driven.

Motorized vehicles may have headlights (also referred to as "headlamps") to permit safe use of the vehicles when driving.

Improvement in headlight control in electric vehicles is desirable.

SUMMARY

In one aspect of the present disclosure, there is provided a method of operating an electric vehicle, the method comprising: responsive to determining that the electric vehicle is connected to an external power source, enabling an operator interface of the electric vehicle to command a headlight of the electric vehicle into an off condition; and responsive to determining that the electric vehicle is disconnected from the external power source and that the electric motor of the electric vehicle is powered, maintaining the headlight of the electric vehicle in an on condition and disabling the operator interface from commanding the headlight of the electric vehicle into the off condition.

The enabling of the operator interface of the electric vehicle to command the headlight of the electric vehicle into the off condition may further be conditional upon detecting that the electric motor of the electric vehicle is powered.

The determining that the electric vehicle is disconnected from the external power source may comprise detecting a disconnection of a charging cable from the electric vehicle, and the method may further comprise, responsive to the detecting, automatically commanding the headlight of the electric vehicle from the off condition to the on condition.

The method may further comprise detecting that a parking brake of the electric vehicle is disengaged, and the automatic commanding the headlight of the electric vehicle from the off condition to the on condition may be conditional upon the detecting that the parking brake is disengaged.

The method may further comprise detecting that a parking brake of the electric vehicle is engaged, and the enabling of the operator interface of the electric vehicle to command the headlight of the electric vehicle into the off condition may be conditional upon the detecting that the parking brake is engaged.

The method may further comprise, responsive to the determining that the electric vehicle is connected to the external power source, automatically dimming at least one other illuminated indicator of the electric vehicle.

The method may further comprise detecting an absence of operator input at the operator interface of the electric vehicle over a predetermined duration, and the automatic dimming of the at least one other illuminated indicator of the electric vehicle may be conditional upon the detecting.

The method may further comprise, responsive to the determining that the electric vehicle is connected to the external power source, enabling the operator interface of the electric vehicle to command at least one other illuminated indicator of the electric vehicle to a dimmed condition.

The method may further comprise, responsive to the determining that the electric vehicle is disconnected from the external power source and that the electric motor of the electric vehicle is powered, enabling the operator interface of the electric vehicle to command the headlight between a high beam condition and a low beam condition.

The method may further comprise, responsive to the determining that the electric vehicle is connected to the external power source, enabling the operator interface to command the headlights between a high beam condition, a low beam condition, and an off condition.

Embodiments may include combinations of the above features.

In another aspect of the present disclosure, there is provided a method of operating an electric vehicle, the method comprising: responsive to determining that an accelerator of the electric vehicle is disabled from propelling the electric vehicle, enabling an operator interface of the electric vehicle to command a headlight of the electric vehicle into an off condition; and responsive to determining that the accelerator of the electric vehicle is enabled to propel the electric vehicle, maintaining the headlight of the electric vehicle in an on condition and disabling the operator interface from commanding the headlight of the electric vehicle into the off condition.

The method may further comprise detecting a disconnection of the electric vehicle from an external power source; and maintaining an illumination condition of the headlight regardless of the detecting, wherein the illumination condition is one of the on condition and the off condition.

The method may further comprise detecting that a parking brake of the electric vehicle is engaged, and the enabling of the operator interface of the electric vehicle to command the headlight of the electric vehicle into the off condition may be conditional upon the detecting that the parking brake of the electric vehicle is engaged.

The method may further comprise, responsive to the determining that the accelerator of the electric vehicle is disabled from propelling the electric vehicle, automatically dimming at least one other illuminated indicator of the electric vehicle.

The method may further comprise detecting an absence of operator input at the operator interface of the electric vehicle over a predetermined duration, and the automatic dimming of the at least one other illuminated indicator of the electric vehicle may be conditional upon the detecting of the absence of operator input at the operator interface.

The method may further comprise, responsive to the determining that the accelerator of the electric vehicle is disabled from propelling the electric vehicle, enabling the operator interface of the electric vehicle to command at least one other illuminated indicator of the electric vehicle to a dimmed condition.

The method may further comprise disabling the accelerator from propelling the electric vehicle responsive to detecting an absence of operator input at the operator interface over a predetermined duration during which the accelerator of the electric vehicle is enabled.

Embodiments may include combinations of the above features.

In another aspect of the present disclosure, there is provided an electric vehicle comprising: an electric motor; a headlight; an operator interface; and a controller operatively coupled to the electric motor, the headlight, and the operator interface, the controller operable to: responsive to determining that the electric vehicle is connected to an external power source, enable the operator interface to command the headlight into an off condition; and responsive to determining that the electric vehicle is disconnected from the external power source and that the electric motor is powered, maintain the headlight in an on condition and disable the operator interface from commanding the headlight into the off condition.

In some embodiments of the electric vehicle, the enabling, by the controller, of the operator interface of the electric vehicle to command the headlight of the electric vehicle into the off condition is further conditional upon detecting, by the controller, that the electric motor of the electric vehicle is powered.

In some embodiments of the electric vehicle, the determining, by the controller, that the electric vehicle is disconnected from the external power source comprises detecting, by the controller, a disconnection of a charging cable from the electric vehicle, and the controller is further operable to, responsive to the detecting, automatically command the headlight of the electric vehicle from the off condition to the on condition.

In some embodiments of the electric vehicle, the controller is further operable to detect that a parking brake of the electric vehicle is disengaged, and the automatic commanding, by the controller, of the headlight of the electric vehicle from the off condition to the on condition is conditional upon the detecting, by the controller, that the parking brake is disengaged.

In some embodiments of the electric vehicle, the controller is further operable to detect that a parking brake of the electric vehicle is engaged, and the enabling, by the controller, of the operator interface of the electric vehicle to command the headlight of the electric vehicle into the off condition is conditional upon the detecting, by the controller, that the parking brake is engaged.

In some embodiments of the electric vehicle, the controller is further operable to, responsive to the determining, by the controller, that the electric vehicle is connected to the external power source, automatically dim at least one other illuminated indicator of the electric vehicle.

In some embodiments of the electric vehicle, the controller is further operable to detect an absence of operator input at the operator interface of the electric vehicle over a predetermined duration, and the automatic dimming, by the controller, of the at least one other illuminated indicator of the electric vehicle is conditional upon the detecting of the absence of operator input at the operator interface.

In some embodiments of the electric vehicle, the controller is further operable to, responsive to the determining, by the controller, that the electric vehicle is connected to the external power source, enable the operator interface of the electric vehicle to command at least one other illuminated indicator of the electric vehicle to a dimmed condition.

In some embodiments of the electric vehicle, the controller is further operable to, responsive to the determining, by the controller, that the electric vehicle is disconnected from the external power source and that the electric motor of the electric vehicle is powered, enable the operator interface of the electric vehicle to command the headlight between a high beam condition and a low beam condition.

In some embodiments of the electric vehicle, the controller is further operable to, responsive to the determining, by the controller, that the electric vehicle is connected to the external power source, enable the operator interface to command the headlights between a high beam condition, a low beam condition, and an off condition.

In some embodiments of the electric vehicle, the headlight comprises a daytime running light.

Embodiments may include combinations of the above features.

In another aspect of the present disclosure, there is provided an electric vehicle comprising: an operator interface including an accelerator; a headlight; and a controller operatively coupled to the operator interface and the headlight, the controller operable to: responsive to determining that the accelerator is disabled from propelling the electric vehicle, enable the operator interface to command the headlight into an off condition; and responsive to determining that the accelerator is enabled to propel the electric vehicle, maintain the headlight in an on condition and disable the operator interface from commanding the headlight into the off condition.

In some embodiments of the electric vehicle, the controller is further operable to: detect a disconnection of the electric vehicle from an external power source; and maintain an illumination condition of the headlight regardless of the detecting, wherein the illumination condition is one of the on condition and the off condition.

In some embodiments of the electric vehicle, the controller is further operable to detect that a parking brake of the electric vehicle is engaged, and the enabling, by the controller, of the operator interface of the electric vehicle to command the headlight of the electric vehicle into the off condition is conditional upon the detecting that the parking brake of the electric vehicle is engaged.

In some embodiments of the electric vehicle, the controller is further operable to, responsive to the determining, by the controller, that the accelerator of the electric vehicle is disabled from propelling the electric vehicle, automatically dim at least one other illuminated indicator of the electric vehicle.

In some embodiments of the electric vehicle, the controller is further operable to detect an absence of operator input at the operator interface of the electric vehicle over a predetermined duration, and the automatic dimming, by the controller, of the at least one other illuminated indicator of the electric vehicle is conditional upon the detecting.

In some embodiments of the electric vehicle, the controller is further operable to, responsive to the determining, by the controller, that the accelerator of the electric vehicle is disabled from propelling the electric vehicle, enable the operator interface of the electric vehicle to command at least one other illuminated indicator of the electric vehicle to a dimmed condition.

In some embodiments of the electric vehicle, the controller is further operable to disable the accelerator from propelling the electric vehicle responsive to detecting, by the controller, an absence of operator input at the operator interface over a predetermined duration during which the accelerator of the electric vehicle is enabled.

In some embodiments, the headlight comprises a daytime running light. Embodiments may include combinations of the above features.

BRIEF DESCRIPTION OF THE DRAWINGS

In the figures which illustrate example embodiments,

FIG. 9 is a headlight state diagram of the alternative embodiment of the electric vehicle whose operation is schematically depicted in FIG. 7.

DESCRIPTION

In this document, any use of the term "exemplary" should be understood to mean "an example of" and not necessarily to mean that the example is preferable or optimal in some way. The terms "connected" and "coupled" may include both direct connection and coupling (where two elements contact one another) and indirect connection and coupling (where at least one additional element is interposed between the two elements). The term "substantially" as used herein may be applied to modify any quantitative representation that could permissibly vary without resulting in a change in the basic function to which it is related.

The systems and methods described herein may be suitable for electric off-road vehicles and electric powersport vehicles. Non-limiting examples of electric off-road/powersport vehicles include snowmobiles, motorcycles, watercraft such as boats and personal watercraft (PWC), all-terrain vehicles (ATVs), and utility task vehicles (UTVs) (e.g., side-by-side).

Figure 1A:
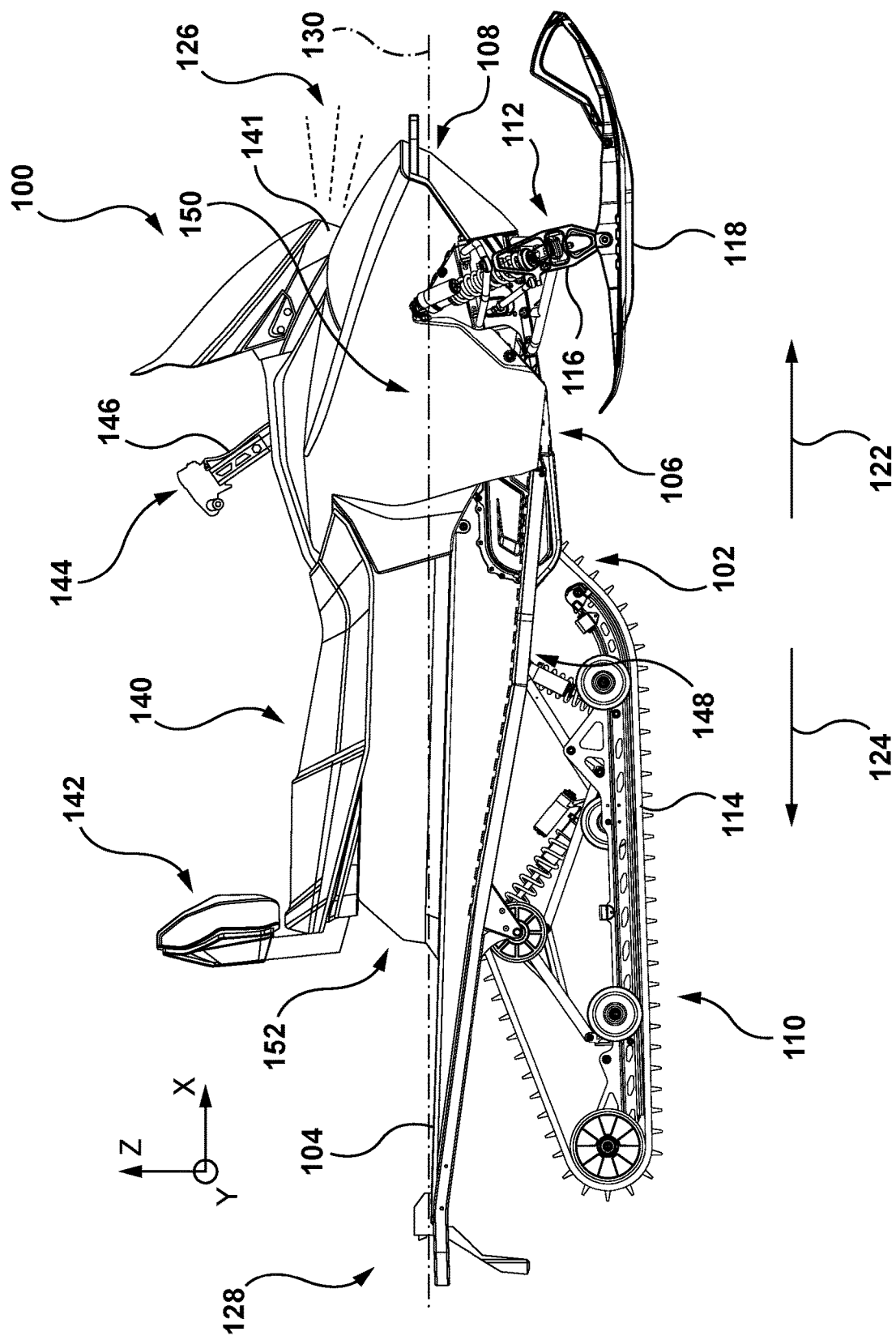
FIG. 1A is a side plan view of an electric vehicle, which in this example is a snowmobile, exemplary of an embodiment of the present disclosure.
Figure 1B:
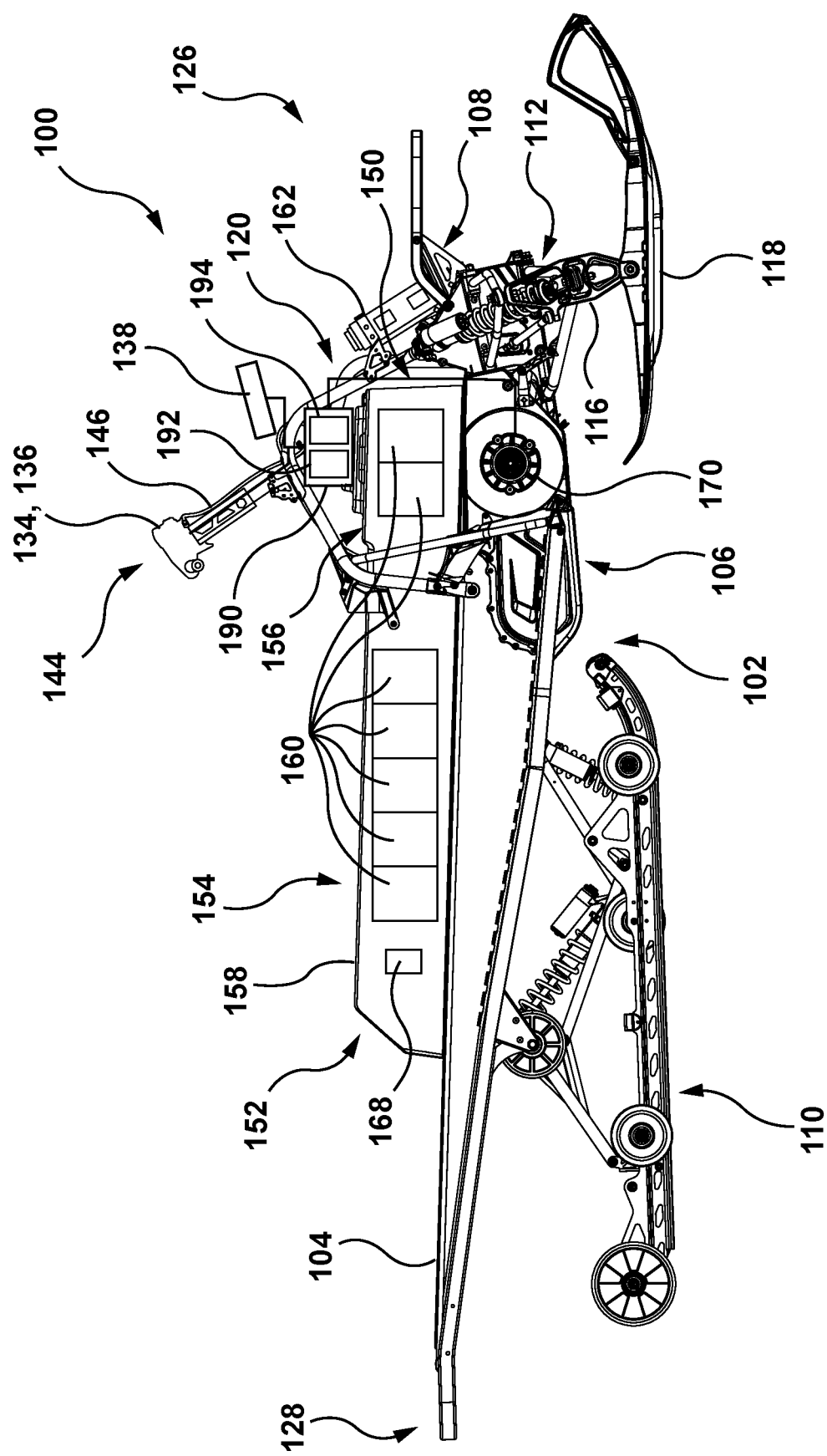
FIG. 1B is another side plan view of interior portions of the electric vehicle embodiment of FIG. 1A.

FIG. 1A illustrates a side plan view of an electric snowmobile 100 (a form of electric vehicle), according to an embodiment. FIG. 1B illustrates another side plan view of the snowmobile 100 with several body panels and other components removed so that the interior of the snowmobile 100 may be viewed. The snowmobile 100 includes a frame 102, which may also be referred to as a "chassis" or "body", that provides a load bearing framework for the snowmobile 100. In the illustrated embodiment, the frame 102 includes a longitudinal tunnel 104, a mid-bay 106 (or "bulkhead") coupled forward of the tunnel 104, and a front sub-frame 108 (or "front brace") coupled forward of the mid-bay 106. In some implementations, the mid-bay 106 may form part of the front sub-frame 108.

The snowmobile 100 also includes a rear suspension assembly 110 and a front suspension assembly 112 to provide shock absorption and improve ride quality. The rear suspension assembly 110 may be coupled to the underside of the tunnel 104 to facilitate the transfer of loads between the rear suspension assembly 110 and the tunnel 104. The rear suspension assembly 110 supports a drive track 114 having the form of an endless belt for engaging the ground (e.g., snow) and propelling the snowmobile 100. The rear suspension assembly may include, inter alia, one or more rails and/or idler wheels for engaging with the drive track 114, and one or more control arms and damping elements (e.g., elastic elements such as coil and/or torsion springs forming a shock absorber) connecting the rails to the tunnel 104. The front suspension assembly 112 includes two suspension legs 116 coupled to the front sub-frame 108 and to respective ground engaging front skis 118 (only one suspension leg 116 and ski 118 are visible in FIGS. 1A and 1B). Each of the suspension legs 116 may include two A-frame arms connected to the front sub-frame 108, a damping element (e.g., an elastic element) connected to the front sub-frame 108, and a spindle connecting the A-frame arms and the damping element to a respective one of the skis 118. The suspension legs 116 transfer loads between the skis 118 and the front sub-frame 108. In the illustrated embodiment, the frame 102 also includes an over structure 120 (shown in FIG. 1B), that may include multiple members (e.g., tubular members) interconnecting the tunnel 104, the mid-bay 106 and/or the front sub-frame 108 to provide additional rigidity to the frame 102. However, as discussed elsewhere herein, the over structure 120 may be omitted in some embodiments.

The snowmobile 100 may move along a forward direction of travel 122 and a rearward direction of travel 124 (shown in FIG. 1A). The forward direction of travel 122 is the direction along which the snowmobile 100 travels in most instances when displacing (i.e., when moving). The rearward direction of travel 124 is the direction along which the snowmobile 100 displaces (i.e., moves) only occasionally, such as when it is reversing. The snowmobile 100 includes a front end 126 and a rear end 128 defined with respect to the forward direction of travel 122 and the rearward direction of travel 124. For example, the front end 126 is positioned ahead of the rear end 128 relative to the forward direction of travel 122. The snowmobile 100 defines a longitudinal center axis 130 that extends between the front end 126 and the rear end 128. Two opposing lateral sides of the snowmobile 100 are defined parallel to the center axis 130. The positional descriptors "front", "rear" and terms related thereto are used in the present disclosure to describe the relative position of components of the snowmobile 100. For example, if a first component of the snowmobile 100 is described herein as being in front of, or forward of, a second component, then the first component is closer to the front end 126 than the second component. Similarly, if a first component of the snowmobile 100 is described herein as being behind, or rearward of, a second component, then the first component is closer to the rear end 128 than the second component. The snowmobile 100 also includes a three-axes frame of reference that is displaceable with the snowmobile 100, where the Z-axis is parallel to the vertical direction, the X-axis is parallel to the center axis 130, and the Y-axis is parallel to the lateral direction.

The snowmobile 100 is configured to carry one or more riders, including a driver (sometimes referred to as an "operator") and optionally one or more passengers. In the illustrated example, the snowmobile 100 includes a straddle seat 140 to support the rider(s). Optionally, the straddle seat 140 includes a backrest 142. The operator of the snowmobile 100 may steer the snowmobile 100 using a steering mechanism 144 (e.g., handlebars), which are operatively connected to the skis 118 via a steering shaft 146 to control the direction of the skis 118. The tunnel 104 may also include or be coupled to footrests 148 (also referred to as "running boards"), namely left and right footrests each sized for receiving a foot of one or more riders sitting on the straddle seat 140. At least one headlight 141 (hereinafter referenced in the singular) is disposed at the front of the snowmobile 100 to facilitate safe use of the snowmobile 100. The headlight 141 may comprise one or more daytime running lights (hereinafter referenced in the singular). For example, the headlight 141 may be the daytime running light, or the headlight 141 may include a daytime running light in addition to a separate high beam and/or low beam light.

Referring to FIG. 1B, the snowmobile 100 is electrically propelled by an electric powertrain 150. The powertrain 150 includes an electric battery 152 (also referred to as a "battery pack") and an electric motor 170. The battery 152, which in some embodiments may be a high voltage battery (and may accordingly be referred to as a "HV battery"), provides electric power for driving the motor 170. The motor 170, in turn, is drivingly coupled to the drive track 114 to propel the snowmobile 100 across the ground.

The battery 152 may include a battery enclosure 158 that houses one or more battery modules 160. The battery enclosure 158 may support the battery modules 160 and protect the battery modules 160 from external impacts, water and/or other hazards or debris. Each battery module 160 may contain one or more battery cells, such as pouch cells, cylindrical cells and/or prismatic cells, for example. In some implementations, the battery cells are rechargeable lithium-ion battery cells. The battery 152 may also include other components to help facilitate and/or improve the operation of the battery 152, including temperature sensors to monitor the temperature of the battery cells, voltage sensors to measure the voltage of one or more battery cells, current sensors to implement column counting to infer the state of charge (SOC) of the battery 152, and/or thermal channels that circulate a thermal fluid to control the temperature of the battery cells. In some implementations, the battery 152 may output electric power at a voltage of between 300 and 800 volts, for example. The snowmobile 100 may also include a charger 162 to convert AC to DC current from an external power source to charge the battery 152. The charger 162 may include, or be connected to, a charging port 163, e.g., as described in connection with FIG. 2 below.

In some implementations, the battery 152 may be generally divided into a tunnel battery portion 154 and a mid-bay battery portion 156. The tunnel battery portion 154 may be positioned above and coupled to the tunnel 104. As illustrated, the straddle seat 140 is positioned above the tunnel battery portion 154 and, optionally, the straddle seat 140 may be supported by the battery enclosure 158 and/or internal structures within the battery 152. The mid-bay battery portion 156 extends into the mid-bay 106 and may be coupled to the mid-bay 106 and/or to the front sub-frame 108. The tunnel battery portion 154 and the mid-bay battery portion 156 may share a single battery enclosure 158, or alternatively separate battery enclosures. In the illustrated example, the tunnel battery portion 154 and the mid-bay battery portion 156 each include multiple battery modules 160 that are arranged in a row and/or stacked within the battery enclosure 158.

It should be noted that other shapes, sizes and configurations of the battery 152 are contemplated. For example, the battery 152 may include multiple batteries that are interconnected via electrical cables. In some embodiments, the battery enclosure 158 may be a structural component of the snowmobile 100 and may form part of the frame 102. For example, the battery enclosure 158 may be coupled to the front sub-frame 108 to transfer loads between the front sub-frame 108 and the tunnel 104. The battery enclosure 158 may be formed from a fiber composite material (e.g., a carbon fiber composite) for additional rigidity. Optionally, in the case that the battery enclosure 158 is a structural component of the snowmobile 100, the over structure 120 may be omitted.

Figure 1C:
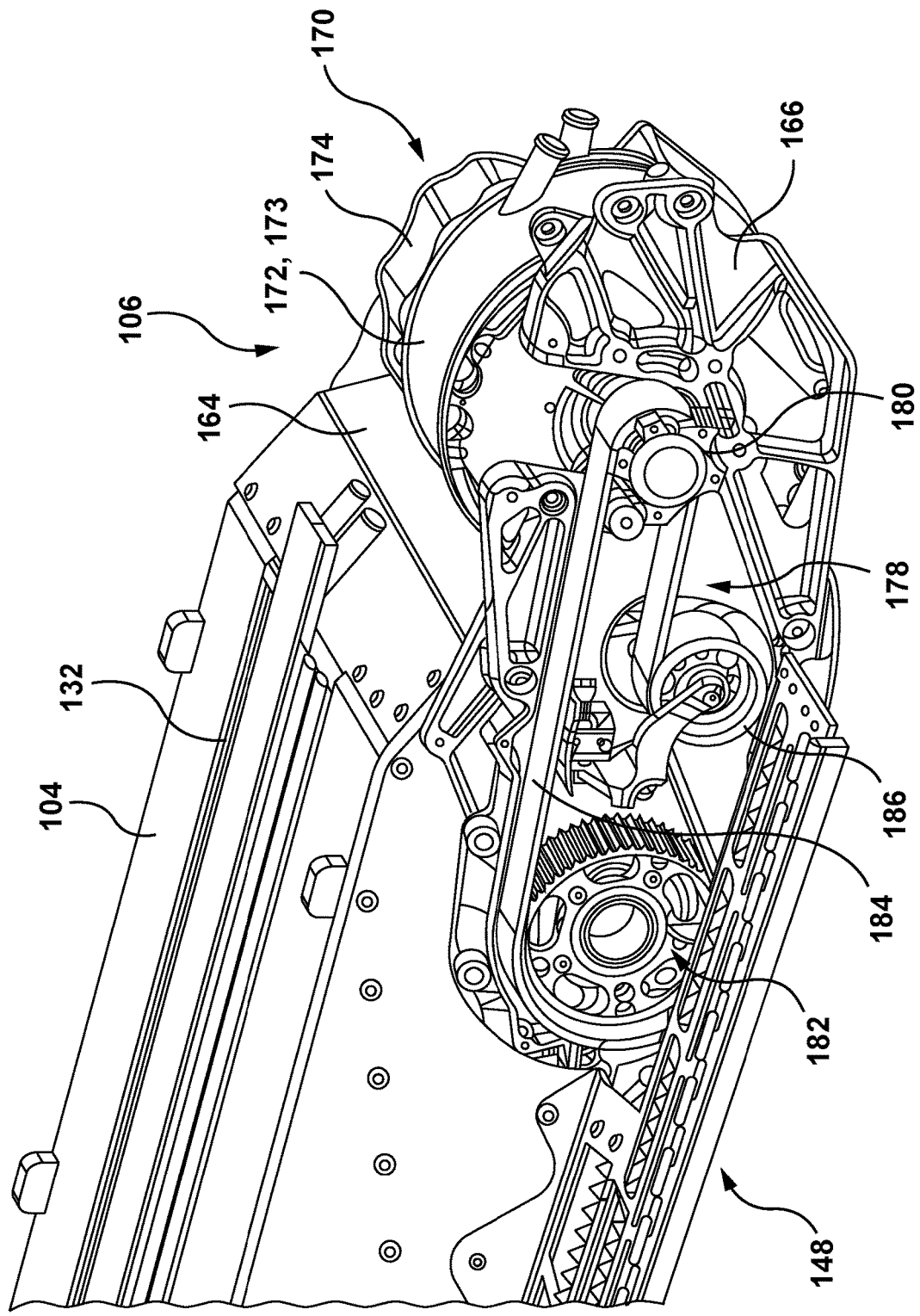
FIG. 1C is a perspective view of the mid-bay of the electric vehicle embodiment of FIG. 1A.

FIG. 1C is a perspective view of the mid-bay 106 of the snowmobile 100. As illustrated, the motor 170 is disposed in a lower portion of the mid-bay 106, below the mid-bay battery portion 156 and forward of a wall 164 defining a front end of the tunnel 104. The motor 170 may be mounted to a transmission plate 166 that is supported between the tunnel 104 and the front sub-frame 108 to help support the motor 170 within the mid-bay 106.

In the illustrated embodiment, the motor 170 is a permanent magnet synchronous motor having a rotor 172 and stator 173. The motor 170 also includes power electronics module 174 (sometimes referred to as an inverter) to convert the direct current (DC) power from the battery 152 to alternating current (AC) power having a desired voltage, current and waveform to drive the motor 170. In some implementations, the power electronics module 174 may include one or more capacitors to reduce the voltage variations between the high and low DC voltage leads, and one or more electric switches (e.g., insulated-gate bipolar transistors (IGBTs)) to generate the AC power. In some implementations, the motor 170 has a maximum output power of between 90 KW and 135 KW. In other implementations, the motor 170 has a maximum output power greater than 135 kW.

In some implementations, the motor 170 may include sensors configured to sense one or more parameters of the motor 170. The sensors may be implemented in the rotor 172, the stator 173 and/or the power electronics module 174. The sensors may include a position sensor (e.g., an encoder) to measure a position and/or rotational speed of the rotor 172, and/or a speed sensor (e.g., a revolution counter) to measure the rotational speed of the rotor 172. Alternatively or additionally, the sensors may include a torque sensor to measure an output torque from the motor 170 and/or a current sensor (e.g., a Hall effect sensor) to measure an output current from the power electronics module 174.

Other embodiments of the motor 170 are also contemplated. For example, the power electronics module 174 may be integrated into the housing or casing of motor 170, as shown in FIG. 1C. However, the power electronics module 174 may also, or instead, be provided externally to the housing or casing of motor 170. In some embodiments, the motor 170 may be a type other than a permanent magnet synchronous motor. For example, the motor 170 may instead be a brushless direct current motor.

The motor 170 may convert the electric power output from the battery 152 into motive power that is transferred to the drive track 114 via a drive transmission 178. The drive transmission 178 engages with a motor drive shaft 180 of the motor 170. The motor drive shaft 180 may extend laterally through an opening in the transmission plate 166. The drive transmission 178 includes a track drive shaft 182 that extends laterally across the tunnel 104. The motor drive shaft 180 and the track drive shaft 182 may extend parallel to each other along transverse axes of the snowmobile 100 and may be spaced apart from each other along the longitudinal axis 130. In the illustrated embodiment, the motor drive shaft 180 is operably coupled to the track drive shaft 182 via a drive belt 184. Sprockets on the motor drive shaft 180 and the track drive shaft 182 may engage with lugs on the drive belt 184. A drive belt idler pulley 186 may also be implemented to maintain tension on the drive belt 184. In other embodiments, another form of linkage such as a drive chain, for example, may operatively connect the motor drive shaft 180 and the track drive shaft 182.

In operation, torque from the motor 170 is transferred from the motor drive shaft 180 to the track drive shaft 182 via the drive belt 184. The track drive shaft 182 includes one or more sprockets (not shown) that engage with lugs on the drive track 114, thereby allowing the track drive shaft 182 to transfer motive power to the drive track 114. It will be understood that the motor 170 may be operated in two directions (i.e., rotate clockwise or counter-clockwise), allowing the snowmobile 100 to travel in the forward direction of travel 122 and in the rearward direction of travel 124. In some implementations, the drive track 114 and the snowmobile 100 may be slowed down via electrical braking (e.g., regenerative braking) implemented by the motor 170 and/or by a mechanical brake (e.g., a disc brake) connected to one of the track drive shaft 182 or the motor drive shaft 180.

The snowmobile 100 may include a heat exchanger 132 that is coupled to, or integrated with, the tunnel 104. The heat exchanger 132 may form part of a thermal management system to control the temperature of the battery 152, the motor 170 and the charger 162, for example. The heat exchanger may include channels to carry a thermal fluid along a portion of the tunnel 104. During operation of the snowmobile 100, the heat exchanger 132 may be exposed to snow and cold air circulating in the tunnel 104 that cools the thermal fluid. The thermal fluid may then be pumped through thermal channels in the battery 152, the motor 170 and/or the charger 162, for example, to cool those components. In some implementations, the thermal management system of the snowmobile 100 may also include a heater 168 to heat the thermal fluid and warm the battery 152. Warming the battery 152 may be useful if the snowmobile 100 has been left for an extended period in a cold environment. In such a case, the temperature of the battery cells in the battery modules 160 may fall to a level where high power is limited from being drawn from the battery 152. Warming the battery 152 may bring the battery cells back into an efficient operating regime. In some implementations, the heater 168 is disposed within the battery enclosure 158.

Referring again to FIG. 1B, one or more controllers 190 (referred to hereinafter in the singular) and an operator interface 134 are part of a control system for controlling operation of the snowmobile 100. The operator interface 134 allows an operator of the snowmobile 100 to generate user inputs and/or instructions for the snowmobile 100. The controller 190 is connected to the operator interface 134 to receive the instructions therefrom and perform operations to implement those instructions. In the illustrated embodiment, the operator interface 134 is partly on the steering mechanism 144 and partly on body panels and/or the vehicle frame 102, and the controller 190 is disposed within the interior of the snowmobile 100, but this need not always be the case.

The operator interface 134 includes an accelerator 136 (also referred to as a "throttle") to allow an operator to control the power generated by the powertrain 150. For example, the accelerator 136 may include a lever to allow the operator to selectively generate an accelerator signal. The controller 190 is operatively connected to the accelerator 136 and to the motor 170 to receive the accelerator signal and produce a corresponding output from the motor 170 to propel the snowmobile 100. In some implementations, the accelerator signal is mapped to a torque of the motor 170. When the controller 190 receives an accelerator signal from the accelerator 136, the controller 190 maps the accelerator signal to a torque of the motor 170 and controls the power electronics module 174 to produce that torque using feedback from sensors in the motor 50. The mapping of the accelerator signal to an output from the motor 170 may be based on a performance mode of the snowmobile 100 (e.g., whether the snowmobile 100 is in a power-saving mode, a normal mode or a high-performance mode). In some examples, the mapping of the accelerator signal to an output from the motor 170 may be based on current operating conditions of the powertrain 150 (e.g., temperature of the battery 152 and/or motor 170, state of charge of the battery 152, etc.). In still other examples, the mapping of the accelerator signal to an output from the motor 170 may be user configurable, such that a user may customize an accelerator position to motor output mapping.

Figure 2:
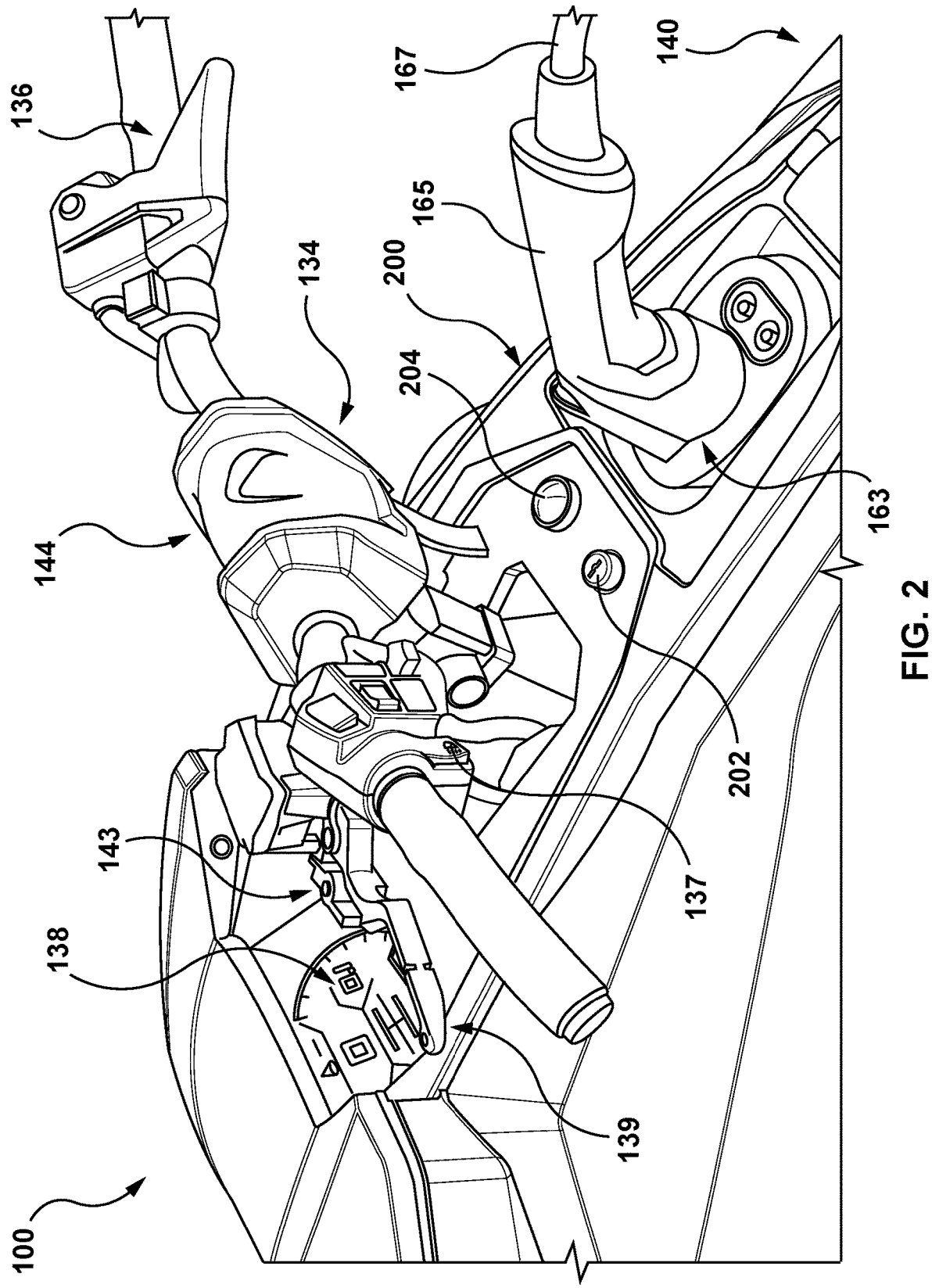
FIG. 2 is a perspective view of an operator interface of the electric vehicle embodiment of FIG. 1A.

In addition to the accelerator 136, the operator interface 134 may include other user input devices (e.g., rotary switches, toggle switches, push buttons, knobs, dials and soft keys) to control various other functionality of the snowmobile 100. Among these user input devices is a headlight control 137 for activating or deactivating the headlight 141 depending upon an operating state of the snowmobile 100, as will be described. The user input devices of operator interface 134 may be connected to the controller 190, which executes the instructions received from the user input devices. Non-limiting examples of such user input devices include a brake lever 139 to implement mechanical and/or electrical braking of the snowmobile 100, a parking brake 143 to enhance the mechanical and/or electrical braking, a reverse option to propel the snowmobile 100 in the rearward direction of travel 124, a device 204 to switch the snowmobile 100 between different vehicle states (e.g., "off", "neutral" and "drive" states), a device to switch the snowmobile 100 between different performance modes, a device to switch between regenerative braking modes (e.g. "off", "low" and "high" modes) and a device to activate heating of handgrips of the steering mechanism. A display screen 138 may also be connected to the controller 190. The display screen 138 may be provided forward of the steering mechanism 144, or in any other suitable location depending on the design of the snowmobile 100. The display screen 138 displays information pertaining to the snowmobile 100 to an operator. Non-limiting examples of such information include the current state of the snowmobile 100, the current performance mode of the snowmobile 100, the speed of the snowmobile 100, the state of charge (SOC) of the battery 152, the angular speed of the motor 170, and the power output from the motor 170. The display screen 138 may include a liquid crystal display (LCD) screen, thin-film-transistor (TFT) LCD screen, light-emitting diode (LED) or other suitable display device. In some embodiments, display screen 138 may be touch-sensitive to facilitate operator inputs and thus may be considered part of the operator interface 134. An example display screen 138 is shown in FIG. 2, described below.

Referring to FIG. 1B, the controller 190 may also control additional functionality of the snowmobile 100. For example, the controller 190 may control a battery management system (BMS) to monitor the SOC of the battery 152 and manage charging and discharging of the battery 152. In another example, the controller 190 may control a thermal management system to manage a temperature of the battery 152, the motor 170 and/or the charger 162 using a thermal fluid cooled by the heat exchanger 132 and/or heated by the heater 168. Temperature sensors in the battery 152 and/or the motor 170 may be connected to the controller 190 to monitor the temperature of these components.

The controller 190 includes one or more data processors 192 (referred hereinafter as "processor 192") and non-transitory machine-readable memory 194. The memory 194 may store machine-readable instructions which, when executed by the processor 192, cause the processor 192 to perform any computer-implemented method or process described herein. The processor 192 may include, for example, any type of general-purpose microprocessor or microcontroller, a digital signal processing (DSP) processor, an integrated circuit, an application-specific integrated circuit (ASIC), a field programmable gate array (FPGA), a reconfigurable processor, other suitably programmed or programmable logic circuits, or any combination thereof. The memory 194 may include any suitable machine-readable storage medium such as, for example, an electronic, magnetic, optical, electromagnetic, infrared, or semiconductor system, apparatus, or device, or any suitable combination thereof. The memory 194 may be located internally and/or externally to the controller 190.

Although the controller 190 is shown as a single component in FIG. 1B, this is only an example. In some implementations, the controller 190 may include multiple controllers distributed at various locations in the snowmobile 100. For example, the controller 190 may include a vehicle control unit (also referred to as a "body controller") that is responsible for interpreting the inputs from various other controllers in the snowmobile 100. Non-limiting examples of these other controllers include a motor controller that is part of the power electronics module 174 and a battery management controller that is part of the battery 152. Optionally, separate battery management controllers may be implemented in the each of the battery modules 160 to form a distributed battery management system.

FIG. 2 is a perspective view of a top portion of the vehicle 100 of the snowmobile 100 of FIG. 1A showing operator interface 134. In the present embodiment, the operator interface 134 is disposed partly upon the handlebars 144 and partly upon body panels and/or the frame 102 of the snowmobile 100.

In the illustrated embodiment, the portion of the operator interface 134 that is disposed on the handlebars 144 includes the accelerator 136. In the non-limiting embodiment shown, the accelerator 136 comprises an accelerator lever pivotally mounted to the right handlebar and biased to a deactivated position. In other embodiments, the accelerator 136 may take the form of a rotatable right handlebar grip that is resiliently biased to a deactivated position. The operator interface 134 further includes a headlight control 137, which is a push button in the present embodiment, on the left side of the handlebars 144.

A parking brake 143 is also disposed on the left side of the handlebars 144. In the present embodiment, the parking brake 143 is implemented as a mechanical lever that locks the brake lever 139 in an engaged (depressed) position using a detent. Other controls may also be provided on handlebars 144.

In the present embodiment, a portion of the operator interface 134 disposed on the frame 102 includes a receptacle 202 for an operator key (or simply "key"). The key, which is not expressly depicted, may permit operation of snowmobile 100 upon engagement with the receptacle 202 or when the key is sufficiently proximate to snowmobile 100 for example. In some embodiments, key may be part of a radio-frequency identification (RFID) system of the snowmobile 100. For example, the key may include an RFID tag that stores data identifying the key or a specific operator associated with the key. When triggered by an electromagnetic interrogation pulse from a RFID reader device associated with snowmobile 100 and operatively connected to controller 190, such an RFID tag may wirelessly transmit its stored data for use by controller 190 to authenticate the key and either permit or prevent the operation of snowmobile 100 based on the data.

The portion of the operator interface 134 on the frame 102 of FIG. 2 further includes a start button 204. The start button 204 may be a physical push button and may be disposed in proximity to receptacle 202. Start button 204 may be operatively connected to controller 190 via a start switch (not expressly depicted). When the operator key engages with receptacle 202, the start switch may selectively cause electrical power to be delivered to controller 190 to cause controller 190 to be powered up, i.e., to activate. For example, an initial press of start button 204 may cause controller 190 to activate, and one or more subsequent presses of start button 204 may instruct controller 190 to transition snowmobile 100 to one or more different operating states, such as "neutral" and "drive", as will be described below. In some embodiments, an integrated circuit powered by a low voltage battery of the snowmobile 100 and exhibiting relatively low power consumption may be operatively connected to start button 204 and to controller 190 to detect actuations of start button 204 and to accordingly instruct controller 190 to activate. Such an integrated circuit may have the form of a system basis chip (SBC) that includes suitable embedded functions.

FIG. 2 further depicts the charging port 163, which in this embodiment is disposed in frame 102 forward of the straddle seat 140. The charging port 163 may take the form of a receptacle configured to receive an insertable plug 165 of a charging cable 167 electrically coupled to an external power source. When the plug 165 is inserted into the charging port 163, the vehicle 100 is said to be "plugged in," i.e., the electric vehicle 100 is connected to the external power source. The charging port 163 may be suitable for receiving a J1772 AC charging plug and/or CCS Level 1 DC fast charging plug. In the present embodiment, the plug 165 has a handle shape and may thus be referred to as a "charge handle." The plug 165 may have other shapes in other embodiments. In some implementations, the charging port 163 may be coverable by one or more removable protective flaps, e.g., made of plastic and/or rubber, to protect the charging port 163 from water, snow, and other debris.

Figure 3:
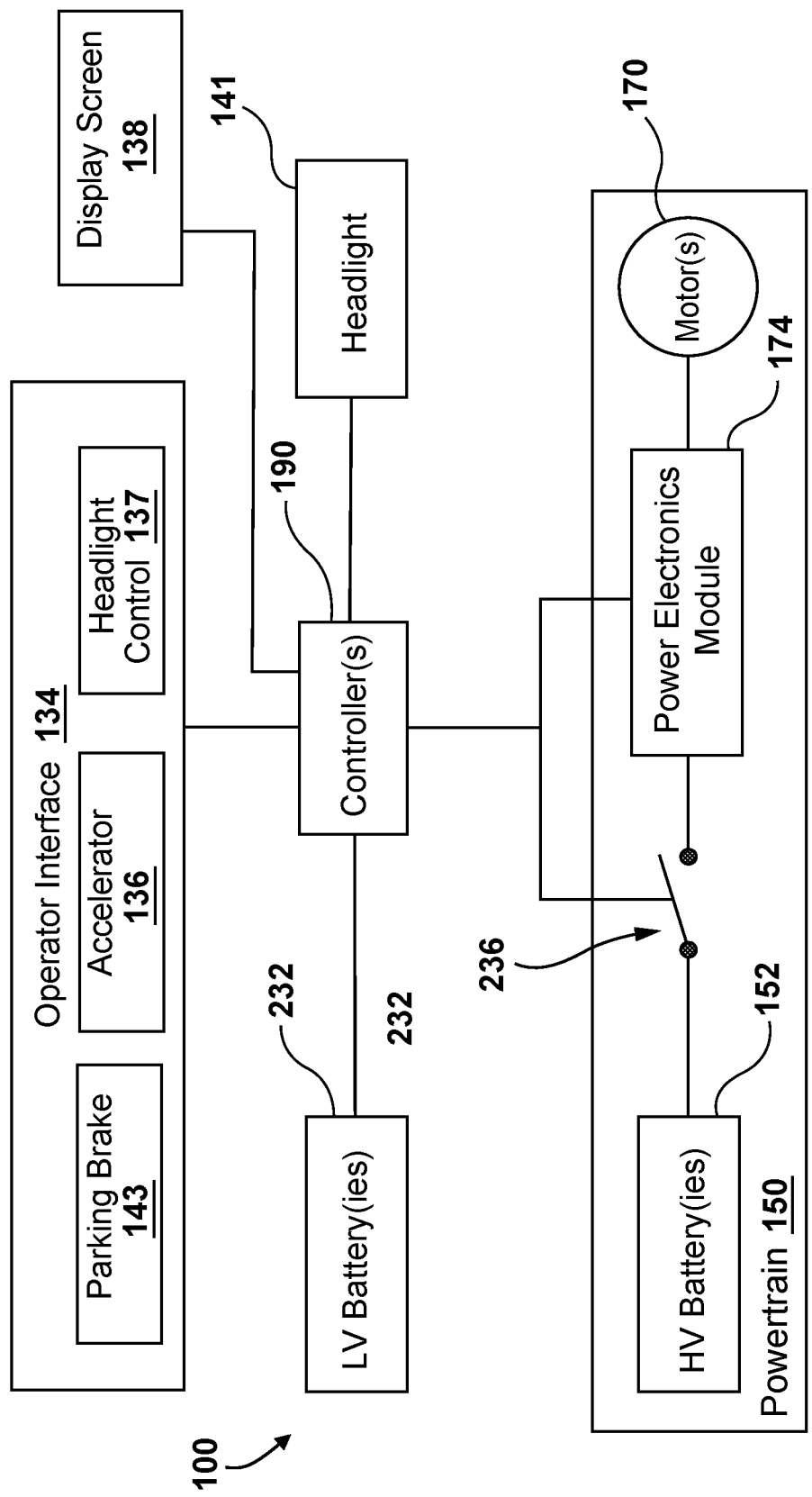
FIG. 3 is a block diagram showing the interrelationship between some of the components of the electric vehicle of FIG. 1A.

FIG. 3 is a block diagram showing the interrelationship between certain components of the electric vehicle 100 that are either controlled by the controller 190 or otherwise associated therewith. The controller 190 is operatively coupled to the operator interface 134, which may include the accelerator 136, headlight control 137 and optionally, the parking brake 143. The controller 190 is further operatively coupled to display screen 138 and headlight 141. The controller 190 may thus receive commands from the accelerator 136, headlight control 137 and optionally the parking brake 143.

One or more low-voltage (LV) batteries 232 (referred hereinafter in the singular) may supply electric power to controller 190 and optionally other low-voltage devices. In some embodiments, LV battery 232 may include one or more lead-acid batteries. In some embodiments, LV battery 232 may be configured to output electric power at a voltage of about 12 volts. LV battery 232 may be electrically connectable to controller 190 either directly or via a suitable DC/DC converter (not depicted).

The powertrain 150 includes the HV battery 152, the power electronics module (PEM) 174, and electric motor 170. HV battery 152 is electrically connectable to PEM 174 using one or more switches 236, referred to as "contactors" or "contactor switches," controllable via controller 190. When the switches 236 are closed, the motor 170 is said to be powered, regardless of whether an accelerator 136 of the snowmobile 100 is operational (enabled) to control motor 170. In other words, when the switches 236 are closed, one or more capacitors within the PEM 174 are charged.

In the depicted embodiment, operation of motor 170 is controlled by controller 190 via the power electronics module 174. As noted, the PEM 174 may include electronic switches (e.g., IGBTs) to provide motor 170 with electric power having the desired voltage, current, waveform, and any other suitable characteristics to implement the desired performance of snowmobile 100 based on operation of accelerator 136 by the operator indicating a command to propel snowmobile 100. The PEM 174 may include an assembly containing power components such as power semiconductor devices interconnected to perform a power conversion function. In some embodiments, power electronics module 174 may include a capacitor and a power inverter for example. Controller 190 may be configured to control motor 170 to propel snowmobile 100 based on commands received via accelerator 136 of operator interface 134, using PEM 174 and one or more sensors such as a tachometer and a torque sensor for example (the latter sensor(s) not being expressly depicted).

Safety regulations in some jurisdictions may require that snowmobiles be equipped with headlights that are on continuously when the engine of the vehicle is operating. For snowmobiles with internal combustion engines, the engine may generally be considered to be operating when it is running, e.g., when its cylinders are firing and fuel is being consumed.

However, in the case of a snowmobile powered by an electric motor, the motor may be considered to be operating whenever the motor is electrically connected to the HV battery 152 via contactor switch(es) 236. For example, the motor 170 may be considered to be operating, or powered, whenever one or more capacitors within the PEM 174 are powered.

In one example, the HV battery 152 may be connected to an external power supply via contactor switches 236 such that the electric motor 170 is powered when the HV battery 152 is being charged by an external power source. In an alternative example, the HV battery 152 may be connected to an external power source without requiring contractor switches 236 to be closed, such that the motor 170 is not powered when the HV battery is connected to an external power source.

For safety reasons, it may be desirable for the headlights of the snowmobile to be on continuously whenever the electric motor is operational (i.e. powered) and/or whenever the accelerator 136 is enabled to propel the snowmobile. If the motor 170 is powered while the HV battery 152 is being charged from an external power source, then the rate of charging may be diminished due to ongoing power consumption by the headlights. This may be considered wasteful of electricity. Moreover, persistently illuminated headlights during charging (i.e. while the electric vehicle is connected to an external power source) might attract undesired attention to the electric vehicle, which may be unattended, and may constitute an undesired source of light pollution.

The present document discloses at least two solutions for controlling headlight behavior to promote safety during electric vehicle operation while mitigating at least some of the above-referenced concerns. These will be described in turn.

Solution 1: Headlight Deactivatible During Charging

Figure 5:
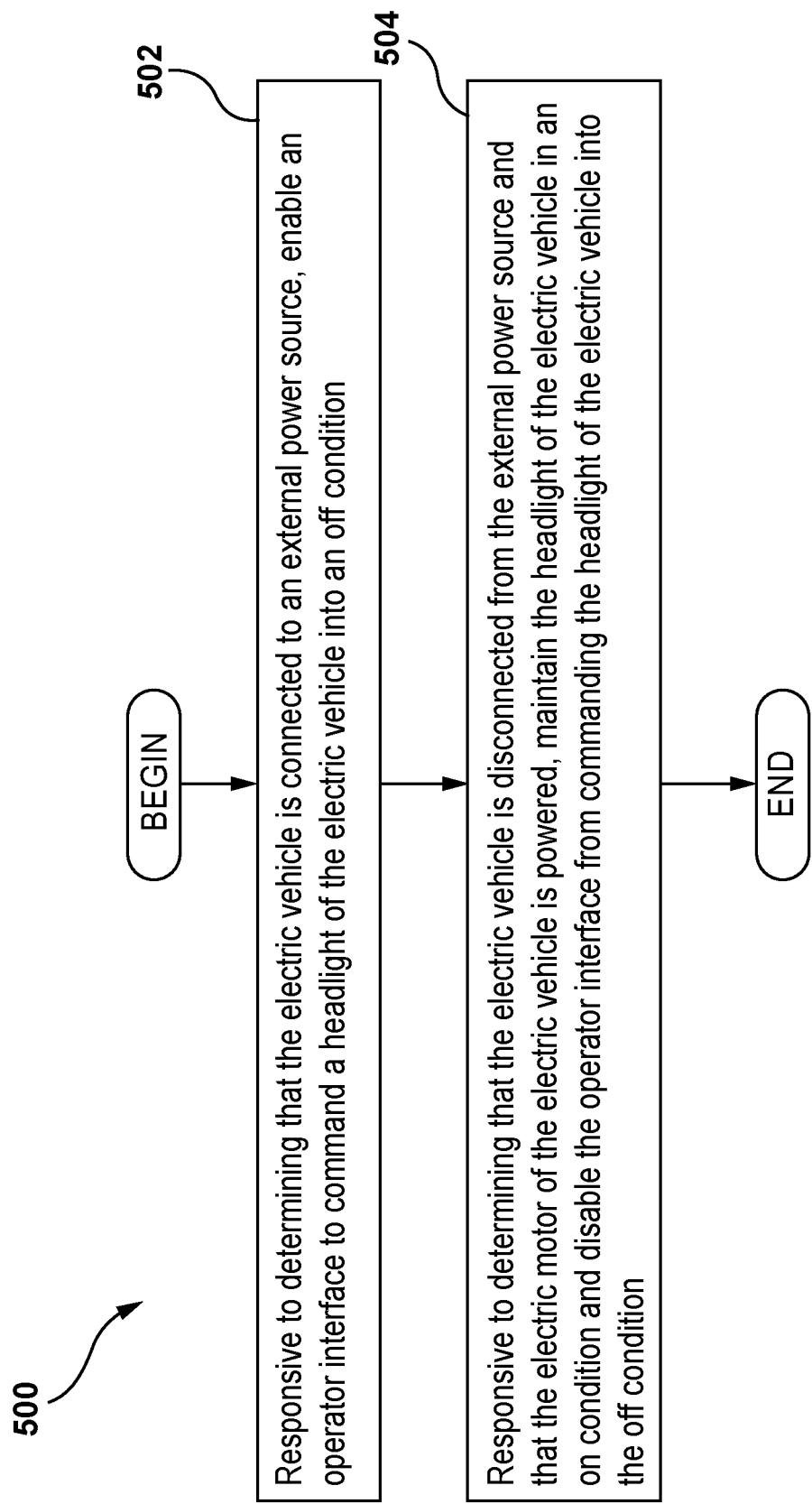
FIG. 5 is a flowchart of operation of the electric vehicle of FIG. 1A.
Figure 6:
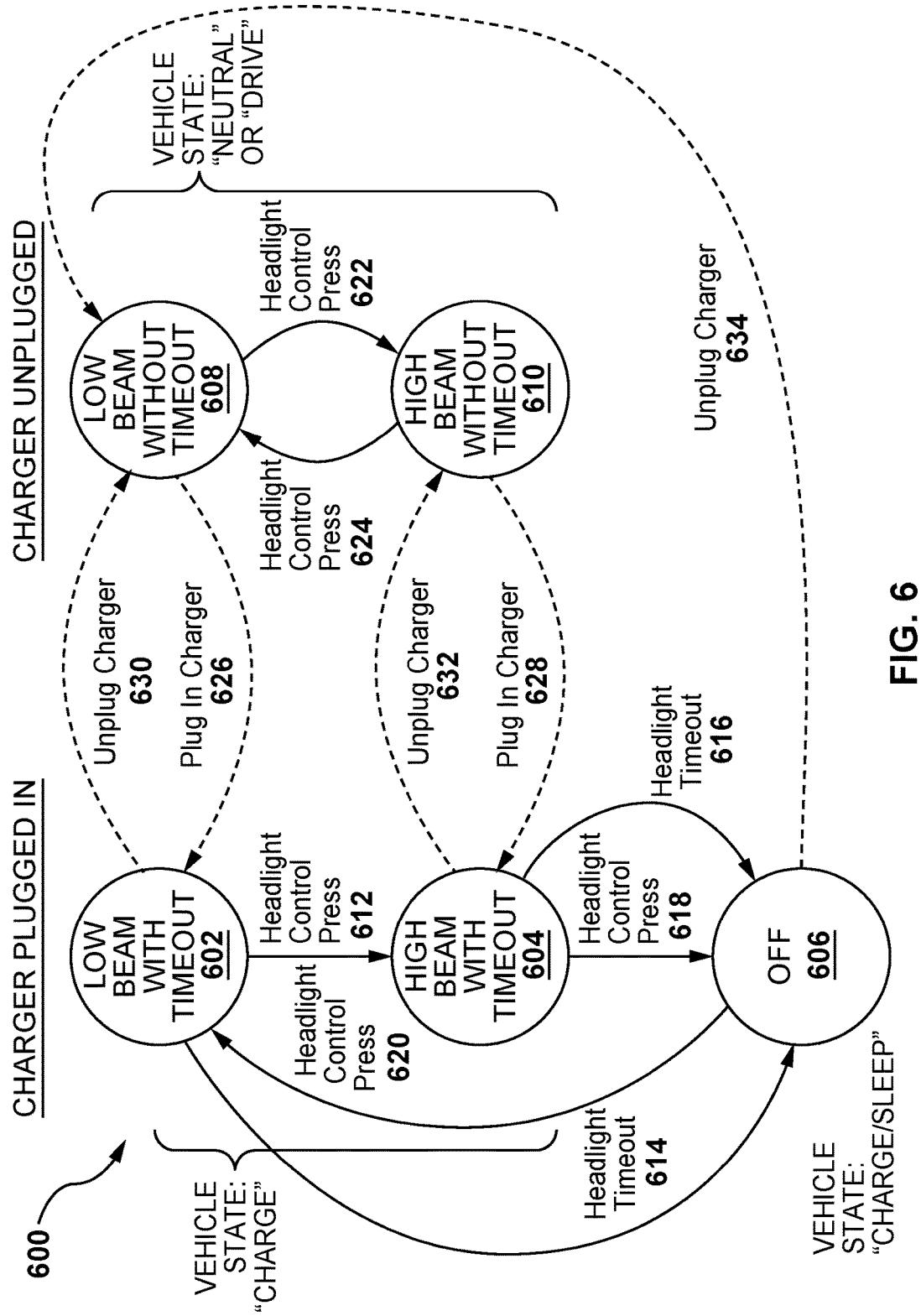
FIG. 6 is a headlight state diagram of the electric vehicle of FIG. 1A.

In overview, a first solution (solution 1) permits the headlight 141 to be deactivated (turned off) while the electric vehicle 100 is charging but not when the vehicle is in a neutral or drive state. Headlight deactivatibility is based upon whether the electric vehicle 100 is connected to an external source of power. An example implementation of solution 1 is depicted in FIGS. 4 to 6.

Figure 4:
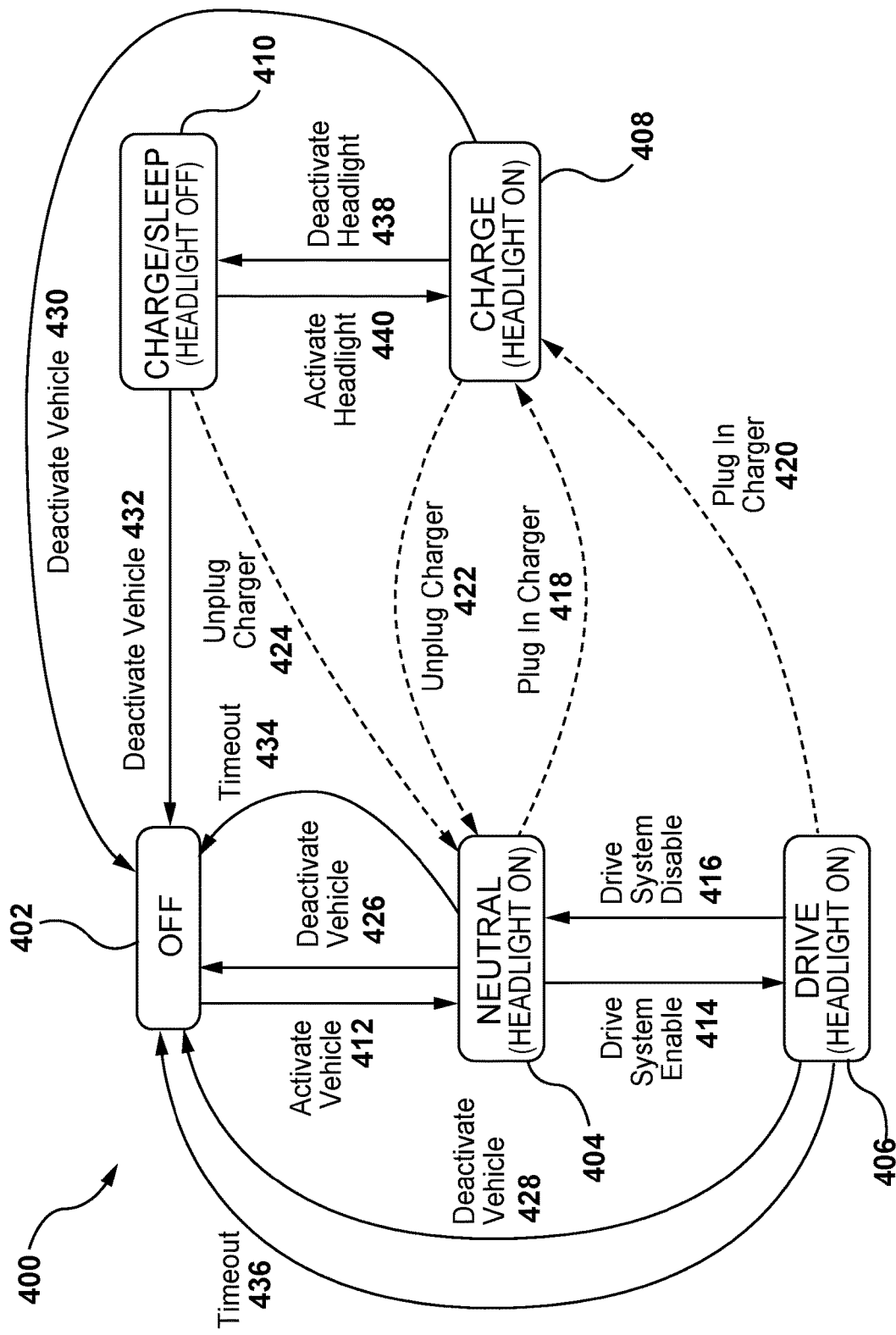
FIG. 4 is a vehicle state diagram of the electric vehicle embodiment of FIG. 1A.

FIG. 4 is a vehicle state diagram showing different states of operation of the snowmobile 100 of FIG. 1A in an example implementation of solution 1. Each vehicle state is depicted as a rounded rectangle. Five states are depicted: OFF state 402; NEUTRAL state 404; DRIVE state 406; CHARGE state 408; and CHARGE/SLEEP state 410. These states will be described in turn.

1. OFF—In the OFF state 402, the electric motor 170 is unpowered. Unpowering of the motor 170 is achieved in the present embodiment by the opening of the contactor switches 236 to the HV battery 152 (see FIG. 3). In the OFF state 402, the controller 190 does not distribute power from HV battery 152 to any major vehicle subsystems (e.g., the thermal management system, battery management system, tractive system, etc.). As earlier noted, the LV battery 232 may be electrically connected to the controller 190 to permit the controller 190 to monitor for an "ON" command from start button 204. In the OFF state 402, the vehicle is in its lowest power mode, i.e., consumes the least amount of power. The electric vehicle 100 may for example be left in the OFF state 402 when it is parked and is not being charged. When the vehicle 100 is in the OFF state 402, the headlight 141 is deactivated, and the portion of the operator interface 134 on handlebars 144 (including accelerator 136 and headlight control 137) is disabled.

2. NEUTRAL—In the NEUTRAL state 404, the electric motor 170 and the major vehicle subsystems (as noted above) are powered. This is achieved in the present embodiment by the closing of contactor switches 236 (FIG. 3). The electric motor 170 is powered in the sense that the closed contactor switches 236 permit the HV battery 152 to power the capacitors of the PEM 174. The accelerator 136 is disabled, i.e., is not operational to propel the vehicle 100. For example, commands from the accelerator 136 that are generated responsive to operator input may be ignored by controller 190. In some embodiments, the controller 190 may cause IGBTs of the PEM 174 not to switch in the NEUTRAL state 404 to allow free-spinning of the motor 170 (e.g., a zero-torque state). This may for example permit an operator to push the electric vehicle 100 manually along the ground with the drive track 114 being free to "roll." When the vehicle is in the NEUTRAL state 404, the headlight 141 is non-deactivatable. In this embodiment, "non-deactivatable" means that the headlight 141 is maintained in the on (activated) condition and cannot be turned off, although it is possible to toggle between low beam and high beam states (as will be described below in connection with FIG. 6). The parking brake 143 may be engaged or disengaged in the NEUTRAL state 404.

3. DRIVE—In the DRIVE state 406, the contactor switch(es) 236 is/are closed, and the motor 170 and all major vehicle subsystems are accordingly powered (as in the NEUTRAL state 404). The accelerator 136 is enabled, i.e., is operational to propel the vehicle (in contrast to the disabled status of the accelerator in the NEUTRAL state 404). Referring to FIG. 3, signals from the accelerator 136 may be received by the controller 190 and converted to suitable motor commands to the PEM 174 to cause motor 170 to spin at a chosen rate. As in the NEUTRAL state 404, the headlight 141 in the DRIVE state 406 is non-deactivatable, meaning that the headlight 141 is maintained in the on (activated) condition and cannot be turned off, although it is possible to toggle between low beam and high beam conditions. The parking brake 143 may be engaged or disengaged in the DRIVE state 406 but is typically disengaged to permit vehicle movement. In some embodiments, the DRIVE state 406 may be considered to encompass driving either forward or in reverse. The operability of the headlight 141 when the electric vehicle 100 is being driven in reverse may accordingly be identical to the operability of the headlight 141 when the electric vehicle 100 is being driven forward.

4. CHARGE—in the CHARGE state 408 (FIG. 4), the electric vehicle 100 is connected to an external power source. In the present embodiment, connection to an external power source may be detected when charge handle 165 is plugged into the charging port 163. The contactor switch(es) 236 of electric vehicle 100 (FIG. 3) may be closed in the CHARGE state 408 to create a conductive path for external power to reach the HV battery 152 for charging purposes. As such, the motor 170 and major vehicle subsystems may be powered. Alternatively, a conductive path between the external power source and the HV battery 142 may not require the motor 170 to be powered. In the CHARGE state 408, the accelerator 136 is disabled, as in the NEUTRAL state 404. This may for example limit a risk of damage to the charging port 163 due to inadvertent electric vehicle acceleration away from a charging station before the charge handle 165 is unplugged. The parking brake 143 may be engaged or disengaged. In the CHARGE state 408, the headlight 141 is activatable and deactivatable. For example, a toggle switch may allow a user to transition the headlight 141 between low beam, high beam and off conditions. Although, transitioning the headlight 141 to the off condition may result in a state transition 438 to the CHARGE/SLEEP state 410.

5. CHARGE/SLEEP—the CHARGE/SLEEP state 410 is identical to the CHARGE state 408 with the exception that the vehicle headlight 141 is deactivated, i.e., in the off condition. In some embodiments, dimming of at least one other illuminated indicator of the electric vehicle 100, such as the display screen 138 (e.g., see FIG. 2), may also occur automatically upon a state transition to the CHARGE/SLEEP state 410, either immediately or after a timeout interval without operator input. Alternatively, an operator interface control to command such dimming may become enabled within operator interface 134 upon a state transition into the CHARGE/SLEEP state 410. For clarity, the term "SLEEP" within the state name of state 410 connotes the deactivated headlight 141 and possible dimming of illuminated indicator(s) in the operator interface 134. If the operator activates the headlight 141 while the electric vehicle 100 is in the CHARGE/SLEEP state 410, a state transition 440 back to the CHARGE state 408 will occur.

In FIG. 4, transitions between states are denoted by unidirectional arrows from the originating state to the destination state. The arrows are labeled with the action triggering the state transition. Dashed arrows denote actions related to electric vehicle charging, whereas solid arrows denote all other types of actions.

From the OFF state 402, the vehicle transitions to the NEUTRAL state 404. This is done by activating the electric vehicle 100 (state transition 412, FIG. 4). In the present embodiment, vehicle activation may be performed by pressing start button 204 (FIG. 2).

From the NEUTRAL state 404, enabling of the drive system will result in a transition into the DRIVE state 406 (state transition 414, FIG. 4). In the present embodiment, the drive system may be enabled by once again pressing start button 204 (FIG. 2).

From the DRIVE state 406, disabling of the drive system will result in a state transition back to the NEUTRAL state 404 (state transition 416, FIG. 4). In the present embodiment, the drive system may be disabled by yet again pressing start button 204 (FIG. 2).

From either of the NEUTRAL state 404 or DRIVE state 406, the act of connecting the electric vehicle 100 to an external power source will result in a state transition to the CHARGE state 408 via state transition 418 or 420, respectively. In the present embodiment, plugging charge handle 165 into charging port 163 may trigger such state transitions.

From either of the CHARGE state 408 or CHARGE/SLEEP state 410, the act of disconnecting the electric vehicle 100 from the external power source will result in a state transition to the NEUTRAL state 404 via state transition 422 or 424, respectively. In the present embodiment, unplugging of charge handle 165 from charging port 163 may trigger such state transitions. In the case of state transition 424, the controller 190 may automatically activate the headlight 141 if the headlight 141 was off (i.e., in a deactivated condition).

From any of the NEUTRAL state 404, DRIVE state 406, CHARGE state 408, and CHARGE/SLEEP state 410, vehicle deactivation will revert the electric vehicle 100 back to the OFF state 402 via state transition 426, 428, 430, and 432, respectively. In the present embodiment, vehicle deactivation may be performed by pressing and holding down start button 204 (FIG. 2) for a predetermined hold interval, which action may be interpreted by controller 190 as a "Deactivate vehicle" command.

From the NEUTRAL state 404 or the DRIVE state 406, elapsing of a predetermined timeout interval with no operator input from operator interface 134 (e.g., from accelerator 136) may revert the electric vehicle 100 back to the OFF state 402 via state transition 434 and 436, respectively. In some embodiments, the absence of accelerator 136 input over a brief interval may trigger a timeout state transition from the DRIVE state 406 to the NEUTRAL state 404 (not expressly depicted) before enough time has elapsed for state transition 436 to be triggered. Automatic vehicle deactivation may help conserve power when the electric vehicle 100 is unattended, particularly in view of the non-deactivatability of the headlight 141 in both of the NEUTRAL state 404 and the DRIVE state 406. Notably, there is no such automatic state transition back to the OFF state 402 from either of the CHARGE state 408 or CHARGE/SLEEP state 410, as such a timeout could undesirably interrupt the charging of HV battery 152.

FIG. 5 is a flowchart of operation 500 of the electric vehicle 100 for rendering the headlight 141 non-deactivatable in predetermined vehicle states. FIG. 5 will be described in connection with the vehicle state diagram 400 of FIG. 4 and the headlight state diagram 600 of FIG. 6. The latter state diagram 600 depicts the operability of headlight 141 via headlight control 137 (FIG. 2) in various ones of the vehicle states of FIG. 4, described above.

In operation 502 (FIG. 5), responsive to determining that the electric vehicle 100 is connected to an external power source, operator interface 134 is enabled to command the headlight 141 into an off condition. In the present embodiment, the electric vehicle 100 is considered to be connected to an external power source when the charge handle 165 is plugged into the charging port 163 (FIG. 2) with the electric vehicle 100 in the CHARGE state 408 or the CHARGE/SLEEP state 410 (FIG. 4). The battery management system is able to detect the presence of the charging handle 165 within the charging port 163 based on a resistor included within the charging handle.

Referring to the headlight state diagram 600 of FIG. 6, it will be appreciated that the drawing conventions are similar to those of vehicle state diagram 400 of FIG. 4. In FIG. 6, each headlight state is depicted as a circle. Five headlight states are depicted: LOW BEAM WITH TIMEOUT state 602; HIGH BEAM WITH TIMEOUT state 604; OFF state 606; LOW BEAM WITHOUT TIMEOUT state 608; and HIGH BEAM WITHOUT TIMEOUT state 610. The term "LOW BEAM," "HIGH BEAM," or "OFF" forming part of each state name of FIG. 6 indicates a respective illumination status of the headlight 141 when in the relevant state.

When the electric vehicle 100 is in the CHARGE state 408 (FIG. 4), the headlight 141 will be in either the LOW BEAM WITH TIMEOUT state 602 or the HIGH BEAM WITH TIMEOUT state 604 of FIG. 6, depending upon whether the operator has set the headlight 141 to the low beam brightness or high beam brightness respectively. In the present embodiment, the operator may change the headlight brightness from low beam to high beam by pressing the headlight control 137 (FIG. 2). Such an operator-initiated change in headlight brightness is represented by state transition 612 of FIG. 6.

As suggested by the state names LOW BEAM WITH TIMEOUT and HIGH BEAM WITH TIMEOUT of FIG. 6, the headlight 141 of the present embodiment will automatically deactivate or "time out" after a predetermined timeout interval has elapsed with no operator input via operator interface 134 in either of states 602 and 604 (i.e., with the vehicle in the CHARGE state 408 of FIG. 4). These automatic headlight deactivations are represented in FIG. 6 by state transitions 614 and 616 respectively. It will be appreciated that such automatic headlight deactivations may conserve power and thereby improve an efficiency of charging of HV battery 152, although they are not strictly required. Such automatic headlight deactivations may also be considered convenient for the operator, who may simply plug in the electric vehicle 100 and leave it unattended, knowing the headlight 141 will deactivate automatically.

Referring again to FIG. 5, in operation 502, the operator interface 134 is enabled to command the headlight 141 into an off condition. In the present embodiment, this may be achieved by enabling control logic at controller 190 that will interpret pressing of the headlight control 137 (FIG. 2) as a "DEACTIVATE HEADLIGHT" command. If such a headlight deactivation command is subsequently detected, the headlight 141 will turn off, i.e., will be commanded to the off condition. In FIG. 6, such headlight deactivation is represented by state transition 618 from the HIGH BEAM WITH TIMEOUT state 604 to the OFF state 606. In the present embodiment, a further pressing of the headlight control 137 will reactivate the headlight 141 at the low beam brightness. In FIG. 6, this is represented by state transition 620 from the OFF state 606 to the LOW BEAM WITH TIMEOUT state 602. In the present embodiment, the operator may toggle the headlight 141 between low beam, high beam and off conditions by repeatedly pressing the headlight control 137 (FIG. 2), as represented by state transitions 612, 618 and 620 of FIG. 6.

In some embodiments, enabling the operator interface 134 to command the headlight to an off condition in operation 502 may further be conditional upon detecting that the electric motor of the electric vehicle is powered.

Referring again to FIG. 5, in operation 504, responsive to determining that the electric vehicle 100 is disconnected from the external power source and that the electric motor 170 of the electric vehicle 100 is powered, the headlight 141 is maintained in an on condition, and the operator interface 134 is disabled from commanding the headlight 141 into the off condition. In the present embodiment, the condition of operation 504 will be met when the charge handle 165 is not plugged into the charging port 163 (FIG. 2) and the electric vehicle 100 is in the NEUTRAL state 404 or the DRIVE state 406 (FIG. 4). In that case, the headlight 141 will either be in the LOW BEAM WITHOUT TIMEOUT state 608 or the HIGH BEAM WITHOUT TIMEOUT state 610 of FIG. 6, depending upon whether the operator has set the headlight 141 to the low beam brightness or high beam brightness respectively. In the present embodiment, the operator may toggle the headlight brightness between low beam and high beam by repeatedly pressing the headlight control 137 (FIG. 2), as represented by state transitions 622 and 624 of FIG. 6.

The disabling of the operator interface 134 from commanding headlight deactivation in operation 504 (FIG. 5) may for example be achieved by disabling control logic at controller 190 from accepting or acting upon any "DEACTIVATE HEADLIGHT" command from headlight control 137 (FIG. 2). It will be appreciated that such disabling of headlight deactivation may promote safety by preventing the headlight 141 from being turned off while the electric vehicle motor is powered and the electric vehicle 100 is not effectively "tethered in place" by a charge cable 167. For safety reasons, and as suggested by the name of each of the LOW BEAM WITHOUT TIMEOUT state 608 and the HIGH BEAM WITHOUT TIMEOUT state 610 of FIG. 6, there is no automatic transition to an off condition of the headlight 141 after a timeout interval from either of those two states.

From the LOW BEAM WITHOUT TIMEOUT state 608 or the HIGH BEAM WITHOUT TIMEOUT state 610, the act of connecting the electric vehicle 100 to an external power source will result in a state transition 626 to the LOW BEAM WITH TIMEOUT state 602 or a state transition 628 to the HIGH BEAM WITH TIMEOUT state 604, respectively. Conversely, from the LOW BEAM WITH TIMEOUT state 602 or the HIGH BEAM WITH TIMEOUT state 604, the act of disconnecting the electric vehicle 100 from the external power source will result in a state transition 630 to the LOW BEAM WITHOUT TIMEOUT state 608 or a state transition 632 to the HIGH BEAM WITHOUT TIMEOUT state 610, respectively. In some embodiments, disconnecting the electric vehicle 100 from an external power source with the headlight 141 off (i.e., in the OFF state 606 of FIG. 6) will automatically turn the headlight 141 on (e.g., will trigger a state transition 634 to the LOW BEAM WITHOUT TIMEOUT state 608).

Table 1 below summarizes the solution 1 approach for rendering headlight 141 deactivatable and non-deactivatable in the depicted embodiment.

TABLE 1

Vehicle and Headlight States - Solution 1

| VEHICLE STATE | MOTOR STATE | CHARGER STATE | HEADLIGHT STATE |
|---|---|---|---|
| OFF | Unpowered | Unplugged | Off |
| NEUTRAL | Powered | Unplugged | On; Non-deactivatable |
| DRIVE | Powered | Unplugged | On; Non-deactivatable |
| CHARGE | Powered or Unpowered | Plugged in | On; Deactivatable |
| CHARGE/ SLEEP | Powered or Unpowered | Plugged in | Off; Deactivatable |

Optionally, for an added level of redundancy in some embodiments, it may also be required for the parking brake 143 of the electric vehicle 100 to be engaged for the headlight 141 to be deactivatable. For example, when the electric vehicle 100 is in the CHARGE state 408 of FIG. 4, the state transition 438 to the CHARGE/SLEEP state 410 may be prevented unless the parking brake 143 is engaged.
Solution 2: Headlight Deactivatable when Accelerator Disabled In overview, a second solution (solution 2) permits an electric vehicle headlight to be deactivated when the accelerator of the electric vehicle is disabled (not operational to propel the vehicle) but not when the accelerator is enabled (operational to propel the vehicle). An implementation of solution 2 is depicted in FIGS. 7 to 9.

Figure 7:
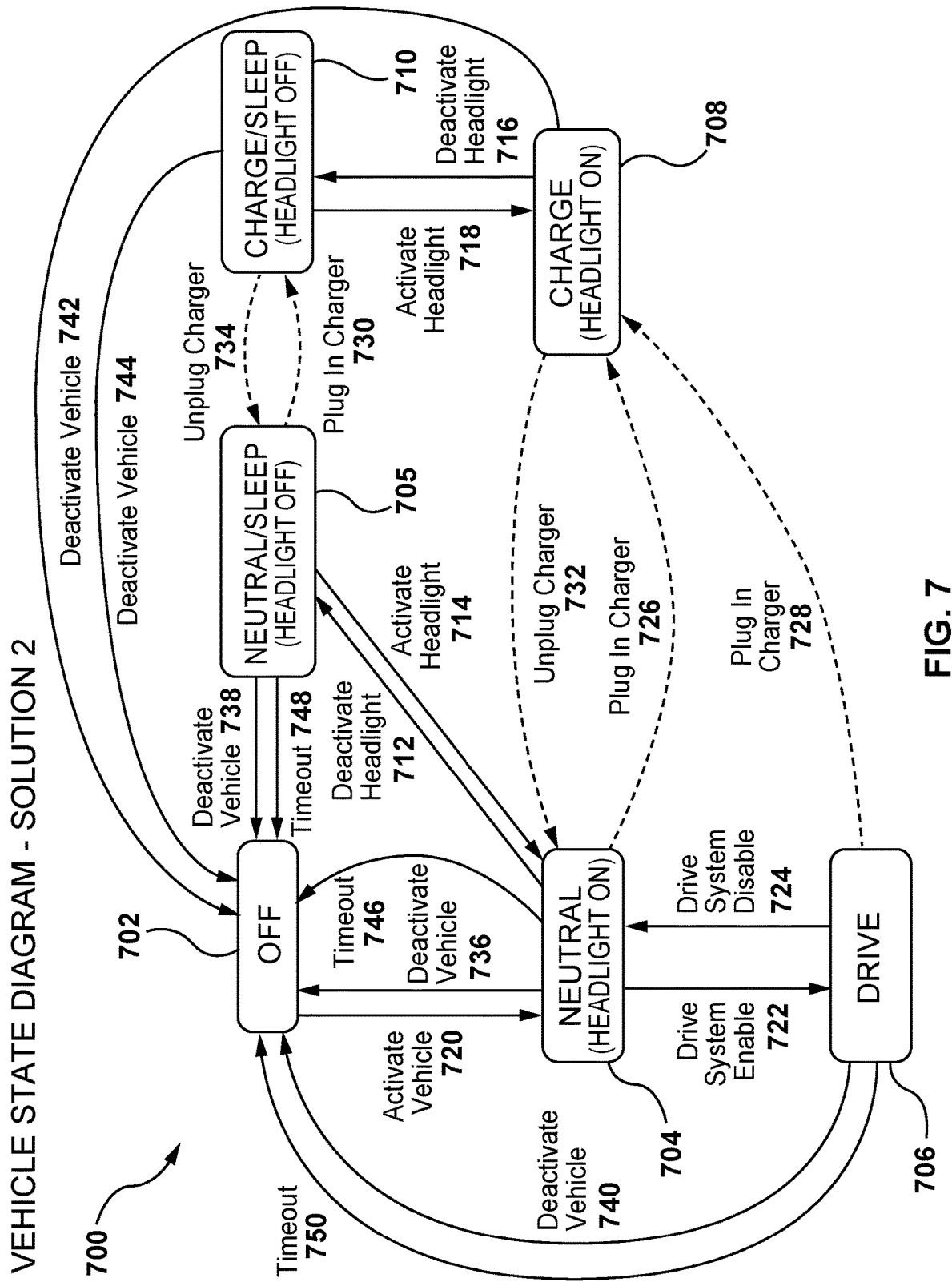
FIG. 7 is a vehicle state diagram of an alternative embodiment of the electric vehicle of FIG. 1A.
Figure 8:
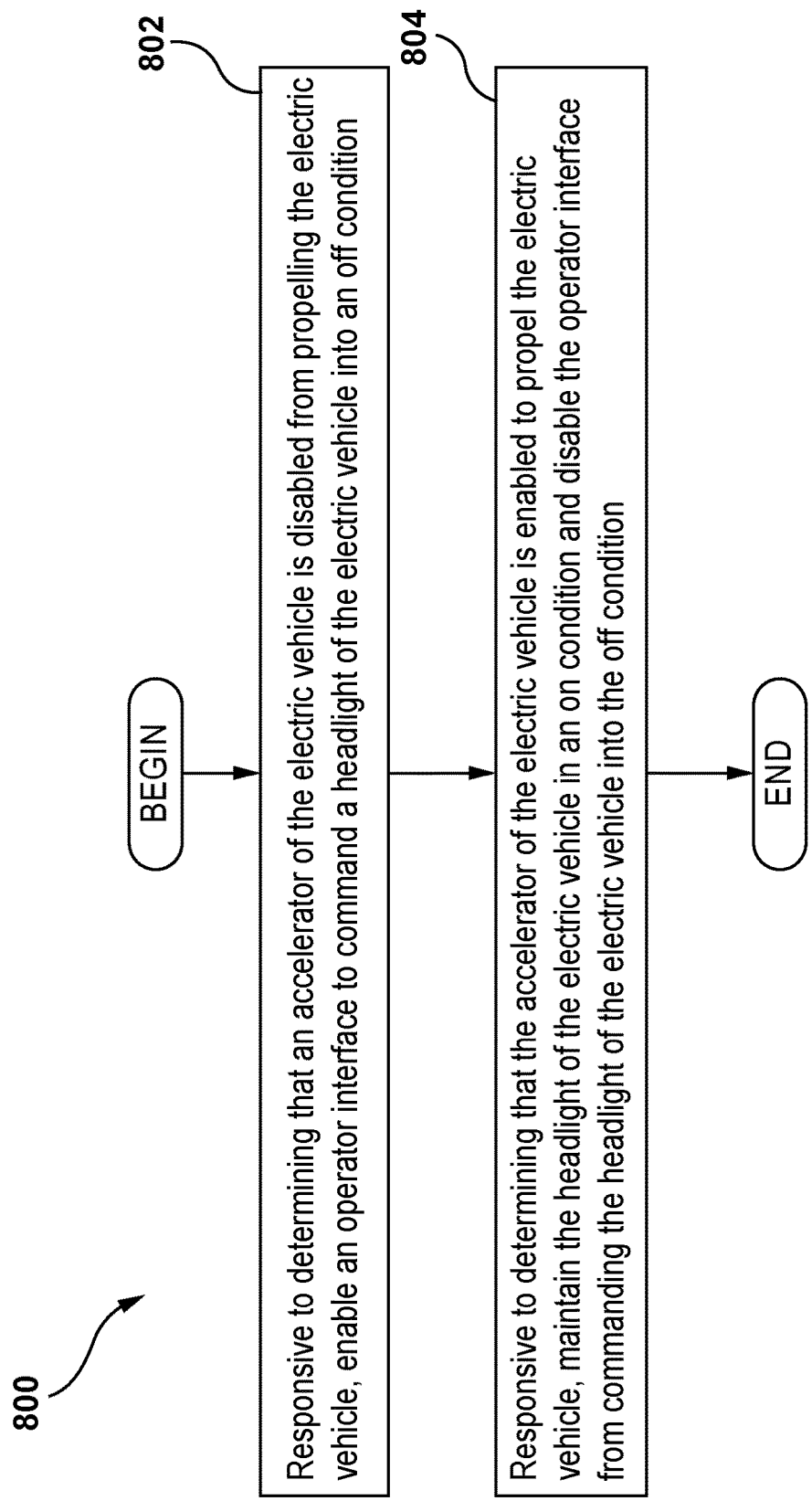
FIG. 8 is a flowchart of operation of the alternative embodiment of the electric vehicle whose operation is schematically depicted in FIG. 7.

FIG. 7 is a vehicle state diagram showing multiple states of operation of the snowmobile 100 of FIG. 1A for solution 2. The drawing conventions of FIG. 7 match those of FIG. 4, as described above. Six states are depicted: OFF state 702; NEUTRAL state 704; NEUTRAL/SLEEP state 705; DRIVE state 706; CHARGE state 708; and CHARGE/SLEEP state 710. These states will be described in turn.

1. OFF—the OFF state 702 of FIG. 7 is similar to the OFF state 402 of FIG. 4. In the OFF state 702, the electric motor 170 and the major vehicle subsystems are unpowered. When the vehicle 100 is in the OFF state 702, the headlight 141 is deactivated, and the portion of the operator interface 134 on handlebars 144 (including accelerator 136 and headlight control 137) is unpowered and thus disabled.

2. NEUTRAL—in certain respects, the NEUTRAL state 702 of FIG. 7 is similar to the NEUTRAL state 404 of FIG. 4. For example, the contactor switch(es) 236 is/are closed and the electric motor 170 and the major vehicle subsystems are powered. The accelerator 136 is disabled i.e., is not operational to propel the vehicle 100. For example, commands from the accelerator 136 that are generated responsive to operator input may be ignored by controller 190. In some embodiments, the PEM 174 may be controlled by controller 190 so that the drive track 114 may be freely rolled. However, the NEUTRAL state 704 of FIG. 7 differs from the NEUTRAL state 404 of FIG. 4 in that the headlight 141 deactivatable in state 704. More specifically, since headlight deactivatability in solution 2 is based on accelerator enabled/disabled status, the disablement of the accelerator 136 in NEUTRAL state 704 means that the headlight 141 is deactivatable in that state. Thus, the controller 190 may accept and act upon a headlight deactivation command from the headlight control 137 of operator interface 134 (e.g., as in the CHARGE state 408 of FIG. 4), resulting in a state transition 712 to the NEUTRAL/SLEEP state 504 (described below). The parking brake 143 may be engaged or disengaged in the NEUTRAL state 704.

3. NEUTRAL/SLEEP—the NEUTRAL/SLEEP state 705 has no counterpart in the vehicle state diagram 400 of FIG. 4. The NEUTRAL/SLEEP state 705 is identical to the above-described NEUTRAL state 704 with the exception that the vehicle headlight 141 is deactivated, i.e., in the off condition (the term "SLEEP" in the state name connotes the deactivated headlight). In some embodiments, dimming of at least one other illuminated indicator of the electric vehicle 100, such as the display screen 138 (FIG. 2), may occur automatically upon a state transition to the NEUTRAL/SLEEP state 705, either immediately or after a timeout interval with no operator input. Alternatively, an operator interface control to command such dimming may become enabled within operator interface 134 upon a state transition into the NEUTRAL/SLEEP state 705. If the operator activates the headlight 141 while the electric vehicle 100 is in the NEUTRAL/SLEEP state 705, a state transition 714 back to the NEUTRAL state 704 will occur.

4. DRIVE—the DRIVE state 706 of FIG. 7 is similar to the DRIVE state 406 of FIG. 4. In the DRIVE state 706, the contactor switch(es) 236 is/are closed, and the motor 170 and all major vehicle subsystems are accordingly powered. The accelerator 136 is enabled, i.e., is operational to propel the vehicle as described above for DRIVE state 406 of solution 1. The headlight 141 is non-deactivatable when the electric vehicle 100 is in the DRIVE state 706. In this embodiment, "non-deactivatable" means that the headlight 141 is maintained in the on (activated) condition and cannot be turned off, although it is possible to toggle between low beam and high beam states (as will be described below in connection with FIG. 9). The parking brake 143 may be engaged or disengaged in the DRIVE state 706 but is typically disengaged to permit vehicle movement. In some embodiments, the DRIVE state 706 may be considered to encompass driving either forward or in reverse. The operability of the headlight 141 when the electric vehicle 100 is being driven in reverse may accordingly be identical to the operability of the headlight 141 when the electric vehicle 100 is being driven forward.

5. CHARGE—the CHARGE state 708 of FIG. 7 is similar to the CHARGE state 408 of FIG. 4. In the CHARGE state 708, the electric vehicle 100 is connected to an external power source. The contactor switches 236 of electric vehicle 100 (FIG. 3) may be closed to create a conductive path for external power to reach the HV battery 152 for charging purposes. As such, the motor 170 and major vehicle subsystems may be powered. Alternatively, a conductive path between the external power source and the HV battery 142 may not require the motor 170 to be powered. The accelerator 136 is disabled for similar reasons as mentioned above for CHARGE state 408 of FIG. 4. The parking brake 143 may be engaged or disengaged. The headlight 141 is on and deactivatable, although headlight deactivation will result in a state transition 716 to the CHARGE/SLEEP state 710.

6. CHARGE/SLEEP—in many respects, the CHARGE/SLEEP state 710 of FIG. 7 is similar to the CHARGE/SLEEP state 410 of FIG. 4. For example, the electric vehicle 100 is connected to an external power source, and the vehicle headlight 141 is deactivated, i.e., in the off condition. In some embodiments, dimming of at least one other illuminated indicator of the electric vehicle 100, such as the display screen 138 (FIG. 2), may occur automatically upon a state transition to the CHARGE/SLEEP state 710, either immediately or after a predetermined timeout interval of no operator input via operator interface 134. Alternatively, an operator interface control to command such dimming may become enabled within operator interface 134 upon a state transition into the CHARGE/SLEEP state 710. If the operator activates the headlight 141 while the electric vehicle 100 is in the CHARGE/SLEEP state 710, a state transition 718 back to the CHARGE state 708 will occur. A difference from the CHARGE/SLEEP state 410 of FIG. 4 is that unplugging the charge handle 165 will result in a state transition 734 to the NEUTRAL/SLEEP state 705 rather than the NEUTRAL state 704.

Other state transitions depicted in state diagram 700 include the following. From the OFF state 702, it is only possible to transition to the NEUTRAL state 704. This is done by activating the electric vehicle 100 (state transition 720, FIG. 7). In the present embodiment, vehicle activation may be performed by pressing start button 204 (FIG. 2).

From the NEUTRAL state 704, enabling of the drive system will result in a transition into the DRIVE state 706 (state transition 722, FIG. 7). In the present embodiment, the drive system may be enabled by once again pressing start button 204 (FIG. 2).

From the DRIVE state 706, disabling of the drive system will result in a state transition back to the NEUTRAL state 704 (state transition 724, FIG. 7). In the present embodiment, the drive system may be disabled by yet again pressing start button 204 (FIG. 2).

State transitions resulting from connecting the electric vehicle 100 to an external power source are as follows. From either of the NEUTRAL state 704 or DRIVE state 706, connection to an external power source will result in a state transition to the CHARGE state 708 via state transition 726 or 728, respectively. From the NEUTRAL/SLEEP state 705, a state transition 730 to the CHARGE/SLEEP state 710 will occur. In each case, headlight activation status (on or off) is preserved as between the source and destination states.

State transitions resulting from disconnecting the electric vehicle 100 from an external power source are as follows. From the CHARGE state 708, the disconnection from the external power source will result in a state transition 732 to the NEUTRAL state 704. From the CHARGE/SLEEP state 710, a state transition 734 to the NEUTRAL/SLEEP state 705 will occur (as noted above). Again, in each case, headlight activation status is preserved as between the source and destination states. In other words, the electric vehicle 100, upon disconnection from an external power source, will maintain an illumination condition of the headlight (on or off) the same between the source and destination states.

From any of the NEUTRAL state 704, NEUTRAL/SLEEP state 705, DRIVE state 706, CHARGE state 708, and CHARGE/SLEEP state 710, vehicle deactivation will revert the electric vehicle 100 back to the OFF state 702 via state transition 736, 738, 740, 742, and 744, respectively. In the present embodiment, vehicle deactivation may be performed by pressing and holding down start button 204 (FIG. 2) for a predetermined hold interval.

From the NEUTRAL state 704, NEUTRAL/SLEEP state 705, and DRIVE state 706, elapsing of a predetermined timeout interval with no operator input from operator interface 134 (e.g., from the accelerator 136) may revert the electric vehicle 100 back to the OFF state 702 via state transition 746, 748, and 750, respectively. In some embodiments, the absence of accelerator 136 input over a brief interval may trigger a timeout state transition from the DRIVE state 706 to the NEUTRAL state 704 (not expressly depicted) before enough time has elapsed for state transition 750 to be triggered. Notably, there is no timeout back to the OFF state 702 from either of the CHARGE state 708 or CHARGE/SLEEP state 710, as such a timeout could undesirably interrupt the charging of HV battery 152.

FIG. 8 is a flowchart of operation 800 of the electric vehicle 100 for rendering the headlight 141 of electric vehicle 100 non-deactivatable in predetermined vehicle states. FIG. 8 will be described in connection with the vehicle state diagram 700 of FIG. 7 and the headlight state diagram 900 of FIG. 9. The latter state diagram 900 depicts the operability of headlight 141 via headlight control 137 (FIG. 2) in various ones of the vehicle states of FIG. 7, as described below.

In operation 802 (FIG. 8), responsive to determining that the accelerator 136 is disabled from propelling the electric vehicle 100, operator interface 134 is enabled to command the headlight 141 into an off condition. In the present embodiment, the accelerator 136 is considered to be disabled when the electric vehicle 100 is in the NEUTRAL state 704 or the CHARGE state 710 for example (FIG. 7).

Referring to FIG. 9, the drawing conventions of the headlight state diagram 900 are similar to those of state diagram 600 of FIG. 6 with the exception that dashed lines denote actions relating to accelerator enabling/disabling rather than charger connection/disconnection. In FIG. 9, the same five headlight states as in FIG. 6 are depicted (correspondingly renumbered): LOW BEAM WITH TIMEOUT state 902; HIGH BEAM WITH TIMEOUT state 904; OFF state 906; LOW BEAM WITHOUT TIMEOUT state 908; and HIGH BEAM WITHOUT TIMEOUT state 910.

When the electric vehicle 100 is in the NEUTRAL state 704 or the CHARGE state 708 of FIG. 7 (the accelerator being disabled in both states), the headlight 141 will be in either the LOW BEAM WITH TIMEOUT state 902 or the HIGH BEAM WITH TIMEOUT state 904 of FIG. 9, depending upon whether the operator has set the headlight 141 to the low beam brightness or high beam brightness respectively. In the present embodiment, the operator may change the headlight brightness from low beam to high beam by pressing the headlight control 137 (FIG. 2). This change is represented by state transition 912 of FIG. 9.

After a predetermined timeout interval has elapsed in either of LOW BEAM WITH TIMEOUT state 902 or the HIGH BEAM WITH TIMEOUT state 904 with no operator input, the headlight 141 of the present embodiment will automatically deactivate. These automatic headlight deactivations are represented in FIG. 9 by state transitions 914 and 916 respectively. It will be appreciated that such automatic headlight deactivations may conserve power but are not strictly required.

Referring again to FIG. 8, in operation 802, the operator interface 134 is enabled to command the headlight 141 into an off condition. This may be done as described above in the context of operation 502 of FIG. 5. If a headlight deactivation command is subsequently detected, the headlight 141 will turn off. In FIG. 9, such headlight deactivation is represented by state transition 918 from the HIGH BEAM WITH TIMEOUT state 904 to the OFF state 906. A further pressing of the headlight control 137 of the present embodiment will reactivate the headlight 141 at the low beam brightness. In FIG. 9, this is represented by state transition 920 from the OFF state 906 to the LOW BEAM WITH TIMEOUT state 902.

Referring again to FIG. 8, in operation 804, responsive to determining that the accelerator 136 is enabled to propel the electric vehicle 100, the headlight 141 is maintained in an on condition, and the operator interface 134 is disabled from commanding the headlight 141 of the electric vehicle into the off condition. In the present embodiment, the condition of operation 804 will be met when the electric vehicle 100 is in the DRIVE state 706 (FIG. 7). In that case, the headlight 141 will either be in the LOW BEAM WITHOUT TIMEOUT state 908 or the HIGH BEAM WITHOUT TIMEOUT state 910 of FIG. 9, depending upon whether the operator has set the headlight 141 to the low beam brightness or high beam brightness respectively. In the present embodiment, the operator may toggle the headlight brightness between low beam and high beam by repeatedly pressing the headlight control 137 (FIG. 2), as represented by state transitions 922 and 924 of FIG. 9 but may not deactivate the headlight 141.

The disabling of the operator interface 134 from commanding headlight deactivation in operation 804 (FIG. 8) may be achieved as described above in connection with operation 504 of FIG. 5. For safety reasons, there is no automatic transition to an off condition of the headlight 141 after a timeout interval from either of the LOW BEAM WITHOUT TIMEOUT state 908 or the HIGH BEAM WITHOUT TIMEOUT state 910.

From the LOW BEAM WITHOUT TIMEOUT state 908 or the HIGH BEAM WITHOUT TIMEOUT state 910, the act of disabling the accelerator 136 will result in a state transition 926 to the LOW BEAM WITH TIMEOUT state 902 or a state transition 928 to the HIGH BEAM WITH TIMEOUT state 904, respectively. Conversely, from the LOW BEAM WITH TIMEOUT state 902 or the HIGH BEAM WITH TIMEOUT state 904, the act of enabling the accelerator 136 will result in a state transition 930 to the LOW BEAM WITHOUT TIMEOUT state 908 or a state transition 932 to the HIGH BEAM WITHOUT TIMEOUT state 910, respectively.

Table 2 below summarizes the solution 2 approach for rendering the headlight activatable and deactivatable in the depicted embodiment.

TABLE 2

Vehicle and Headlight States - Solution 2

| VEHICLE STATE | ACCELERATOR STATE | HEADLIGHT STATE |
| --- | --- | --- |
| OFF | Disabled | Off |
| NEUTRAL | Disabled | On; Deactivatable |
| NEUTRAL/SLEEP | Disabled | Off; Deactivatable |
| DRIVE | Enabled | On; Non-deactivatable |
| CHARGE | Disabled | On; Deactivatable |
| CHARGE/SLEEP | Disabled | Off; Deactivatable |

Optionally, for an added level of redundancy in some embodiments, it may also be required for the parking brake 143 of the electric vehicle 100 to be engaged for the headlight 141 to be deactivatable. For example, when the electric vehicle 100 is in the CHARGE state 708 of FIG. 7, the state transition 438 to the CHARGE/SLEEP state 710 may be prevented unless the parking brake is engaged.

Various alternative embodiments are possible.

Systems and methods are described and shown in the present disclosure in relation to a snowmobile 100, but the present disclosure may also be applied to other types of electric vehicles, including other types of off-road and powersport vehicles.

The headlight control 137 need not be a single button as depicted in FIG. 2. In some embodiments, the headlight control may have separate "OFF" input device for deactivating the headlight. In such embodiments, the "OFF" input device may be disabled whenever the electric vehicle 100 is in a vehicle state in which the headlight is non-deactivatable.

In each of the above-described embodiments, the headlight of the electric vehicle may be commanded to either of a "LOW BEAM" or "HIGH BEAM" illumination status when in the on condition. In alternative electric vehicle embodiments, the headlight may be commanded to more than two illumination statuses, or may have only one default illumination status, when in the on condition.

At least some embodiments described herein incorporate an electro-mechanical start button 204 that is activated by pressing, e.g., to start the electric vehicle 100 and to cycle between "OFF," "NEUTRAL," and "DRIVE" states. Similarly, embodiments described above may incorporate a headlight control 137 that is a button activatable by pressing. It will be appreciated that alternative embodiments may substitute other user input mechanisms that are not strictly buttons and are not necessarily activated by pressing, e.g., knobs that are rotated or touchscreens that are tapped. Any reference to "pressing" of a "start button" or "headlight control" should accordingly be understood to encompass suitable activation of whatever user input mechanism may be utilized in the embodiment in question.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method of operating an electric vehicle, the method comprising:

responsive to determining that the electric vehicle is connected to an external power source, enabling an operator interface of the electric vehicle to command a headlight of the electric vehicle into an off condition; and responsive to determining that the electric vehicle is disconnected from the external power source and that the electric motor of the electric vehicle is powered, maintaining the headlight of the electric vehicle in an on condition and disabling the operator interface from commanding the headlight of the electric vehicle into the off condition.

2. The method of claim 1 wherein the enabling of the operator interface of the electric vehicle to command the headlight of the electric vehicle into the off condition is further conditional upon detecting that the electric motor of the electric vehicle is powered.

3. The method of claim 1 wherein the determining that the electric vehicle is disconnected from the external power source comprises detecting a disconnection of a charging cable from the electric vehicle and further comprising, responsive to the detecting, automatically commanding the headlight of the electric vehicle from the off condition to the on condition.

4. The method of claim 1 further comprising detecting that a parking brake of the electric vehicle is engaged and wherein the enabling of the operator interface of the electric vehicle to command the headlight of the electric vehicle into the off condition is conditional upon the detecting that the parking brake is engaged.

5. The method of claim 1 further comprising, responsive to the determining that the electric vehicle is connected to the external power source, automatically dimming at least one other illuminated indicator of the electric vehicle.

6. The method of claim 5 further comprising detecting an absence of operator input at the operator interface of the electric vehicle over a predetermined duration and wherein the automatic dimming of the at least one other illuminated indicator of the electric vehicle is conditional upon the detecting.

7. The method of claim 1 further comprising, responsive to the determining that the electric vehicle is connected to the external power source, enabling the operator interface of the electric vehicle to command at least one other illuminated indicator of the electric vehicle to a dimmed condition.

8. The method of claim 1 further comprising, responsive to the determining that the electric vehicle is disconnected from the external power source and that the electric motor of the electric vehicle is powered, enabling the operator interface of the electric vehicle to command the headlight between a high beam condition and a low beam condition.

9. The method of claim 8 further comprising, responsive to the determining that the electric vehicle is connected to the external power source, enabling the operator interface to command the headlights between a high beam condition, a low beam condition, and an off condition.

10. The method of claim 1 wherein determining that the electric vehicle is connected to the external power source comprises determining that a charge handle of the external power source is plugged into a charging port of the electric vehicle.

11. An electric vehicle comprising:
an electric motor;
a headlight;
an operator interface; and
a controller operatively coupled to the electric motor, the headlight, and the operator interface, the controller operable to:
responsive to determining that the electric vehicle is connected to an external power source, enable the operator interface to command the headlight into an off condition; and
responsive to determining that the electric vehicle is disconnected from the external power source and that the electric motor is powered, maintain the headlight in an on condition and disable the operator interface from commanding the headlight into the off condition.

12. The electric vehicle of claim 11 wherein the enabling, by the controller, of the operator interface of the electric vehicle to command the headlight of the electric vehicle into the off condition is further conditional upon detecting, by the controller, that the electric motor of the electric vehicle is powered.

13. The electric vehicle of claim 11 wherein the determining, by the controller, that the electric vehicle is disconnected from the external power source comprises detecting, by the controller, a disconnection of a charging cable from the electric vehicle and wherein the controller is further operable to, responsive to the detecting, automatically command the headlight of the electric vehicle from the off condition to the on condition.

14. The electric vehicle of claim 11 wherein the controller is further operable to, responsive to the determining, by the controller, that the electric vehicle is connected to the external power source, automatically dim at least one other illuminated indicator of the electric vehicle.

15. The electric vehicle of claim 14 wherein the controller is further operable to detect an absence of operator input at the operator interface of the electric vehicle over a predetermined duration and wherein the automatic dimming, by the controller, of the at least one other illuminated indicator of the electric vehicle is conditional upon the detecting of the absence of operator input at the operator interface.

16. The electric vehicle of claim 11 wherein the controller is further operable to, responsive to the determining, by the controller, that the electric vehicle is connected to the external power source, enable the operator interface of the electric vehicle to command at least one other illuminated indicator of the electric vehicle to a dimmed condition.

17. The electric vehicle of claim 11 wherein the headlight comprises a daytime running light.

18. The electric vehicle of claim 11 comprising a charging port, wherein determining, by the controller, that the electric vehicle is connected to the external power source comprises determining that a charge handle of the external power source is plugged into the charging port.

* * * * *